(12) United States Patent
Yang et al.

(10) Patent No.: US 11,482,109 B2
(45) Date of Patent: Oct. 25, 2022

(54) COOPERATIVE VEHICLE MONITORING

(71) Applicant: Toyota Motor Engineering & Manufacturing North America, Inc., Erlanger, KY (US)

(72) Inventors: Hao Yang, Aliso Viejo, CA (US); Kentaro Oguchi, Mountain View, CA (US)

(73) Assignee: TOYOTA MOTOR ENG & MFG NORTH AMERICA, INC., Plano, TX (US)

( * ) Notice: Subject to any disclaimer, the term of this patent is extended or adjusted under 35 U.S.C. 154(b) by 237 days.

(21) Appl. No.: 16/806,907

(22) Filed: Mar. 2, 2020

(65) Prior Publication Data
US 2021/0272462 A1 Sep. 2, 2021

(51) Int. Cl.
G05D 1/02 (2020.01)
G08G 1/00 (2006.01)
(Continued)

(52) U.S. Cl.
CPC .......... G08G 1/166 (2013.01); G05D 1/0212 (2013.01); G05D 1/0285 (2013.01); G08G 1/20 (2013.01);
(Continued)

(58) Field of Classification Search
CPC .. B60W 40/105; B60W 40/107; B60W 50/14; B60W 30/18163; B60W 2554/80; B60W 2050/143; B60W 2520/10; G05D 1/0212; G05D 1/0285; G05D 2201/0212; G05D 2201/0213; G05D 1/0289; G08G 1/20; G08G 1/166
(Continued)

(56) References Cited

U.S. PATENT DOCUMENTS 9,623,876 B1 4/2017 Slusar
2006/0253307 A1 11/2006 Warren et al.
(Continued)

FOREIGN PATENT DOCUMENTS

WO 2019180551 A1 9/2019

OTHER PUBLICATIONS https://ieeexplore.ieee.org/stamp/stamp.jsp?tp=&arnumber=6083132 &tag=1 Redmill, 2011 14th International IEEE Conference on Intelligent Transportation Systems Washington, DC, USA. Oct. 5-7, 2011 ( Year: 2011).*
(Continued)

Primary Examiner — Abby Y Lin
Assistant Examiner — Hossam M Abd El Latif
(74) Attorney, Agent, or Firm — VLP Law Group LLP; Michel Bohn

(57) ABSTRACT

In an example, a method captures, at a first connected vehicle situated in a travel path segment, first sensor data describing an environment proximate to the first connected vehicle. The environment includes a first unconnected vehicle. The method wirelessly receives, via a communication network at the first connected vehicle from a second connected vehicle situated in the travel path segment, second sensor data describing one or more operating characteristics of the first unconnected vehicle. The method estimates, using the first sensor data and the second sensor data, a vehicle action of the first unconnected vehicle.

20 Claims, 12 Drawing Sheets

(51) Int. Cl.
   *G08G 1/0967* (2006.01)
   *G08G 1/16* (2006.01)
(52) U.S. Cl.
   CPC ............... *G05D 2201/0212* (2013.01); *G05D 2201/0213* (2013.01)
(58) Field of Classification Search
   USPC .......................................................... 701/25
   See application file for complete search history.

(56) References Cited

U.S. PATENT DOCUMENTS

| | | | |
|---|---|---|---|
| 2018/0240335 A1* | 8/2018 | Dong | G08G 1/056 |
| 2019/0311614 A1 | 10/2019 | Yang et al. | |
| 2020/0180625 A1* | 6/2020 | Takhirov | B60W 30/1819 |
| 2021/0109545 A1* | 4/2021 | Lopez | G05D 1/0291 |
| 2021/0157332 A1* | 5/2021 | Cox | G05D 1/0088 |

OTHER PUBLICATIONS

Betke, M., et al., Real-time multiple vehicle detection and tracking from a moving vehicle, Machine Vision and Applications, vol. 12(2), pp. 69-83, 2000.

Dai, J., et al., Mobile phone based drunk driving detection, The 4th International Conference on Pervasive Computing Technologies for Healthcare, pp. 1-8, Mar. 2010.

Goodall, N., Real-time prediction of vehicle locations in a connected vehicle environment, Tech Report, Virginia Center for Transportation Innovation and Research, Virginia Department of Transportation, 2013 (55 pages).

\* cited by examiner

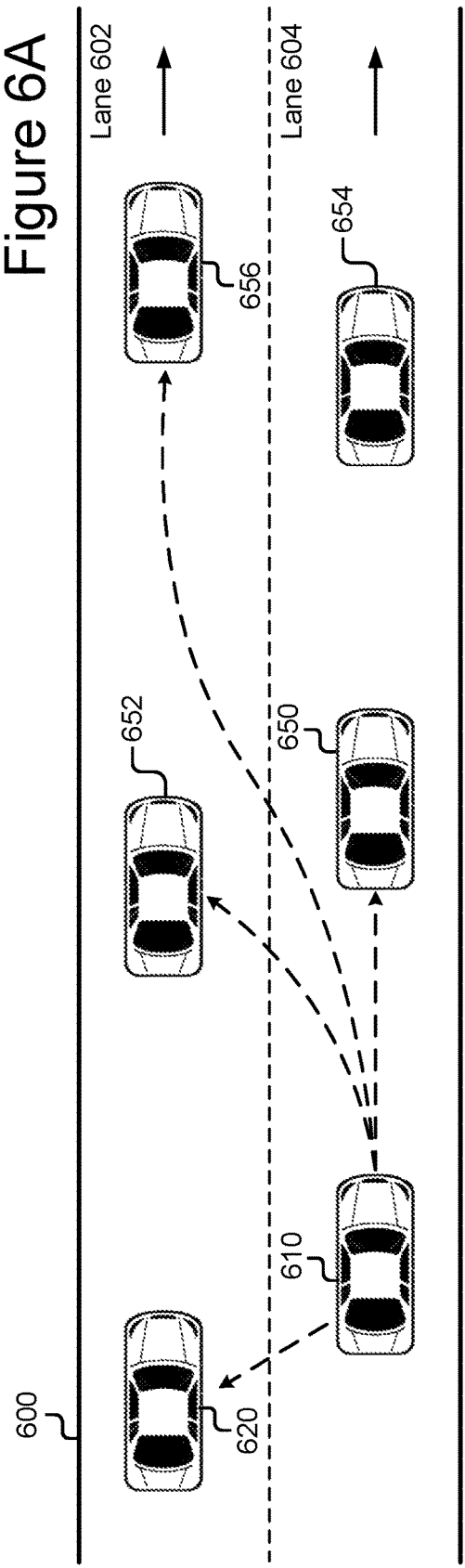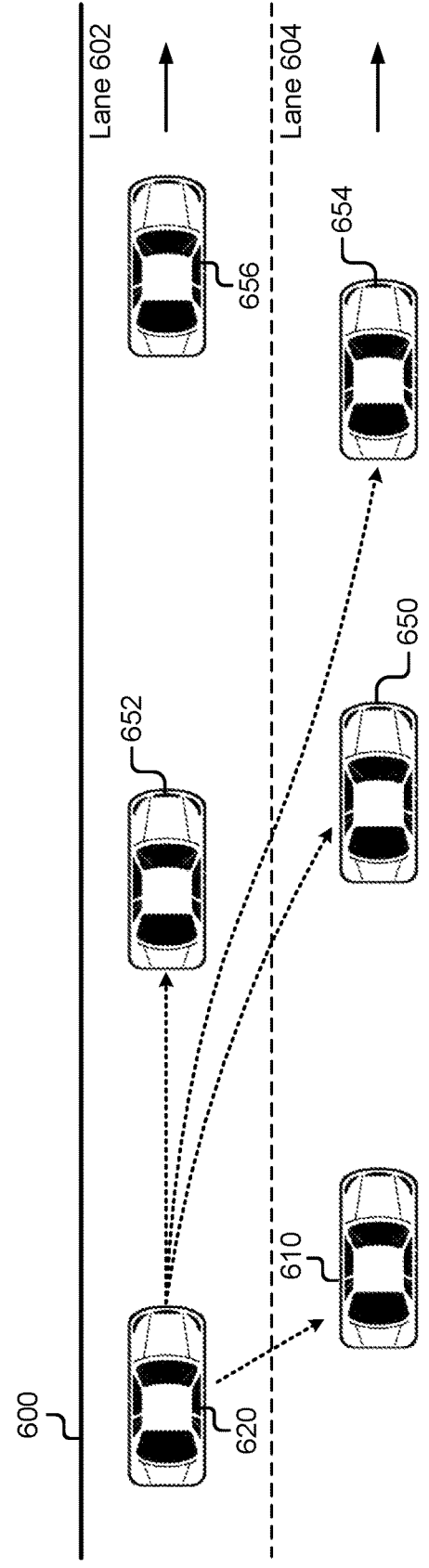

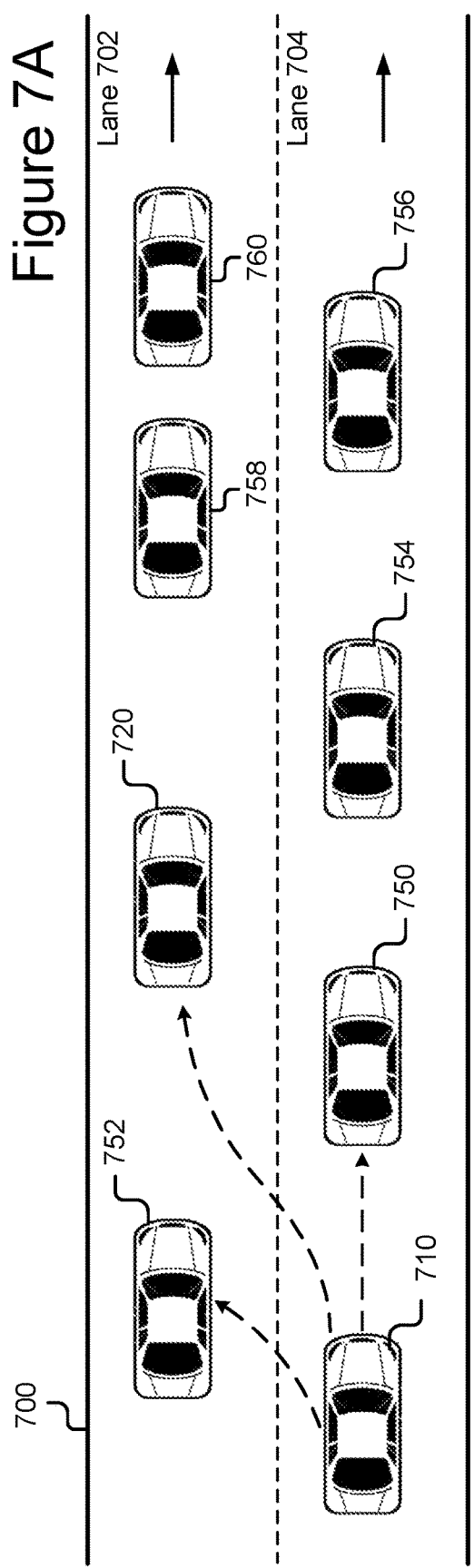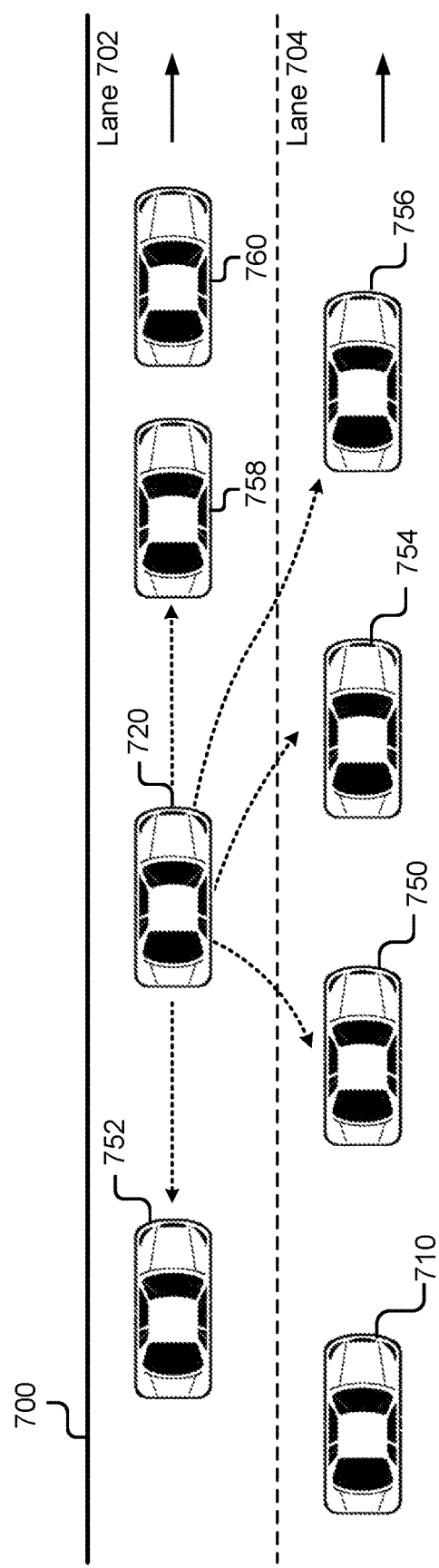

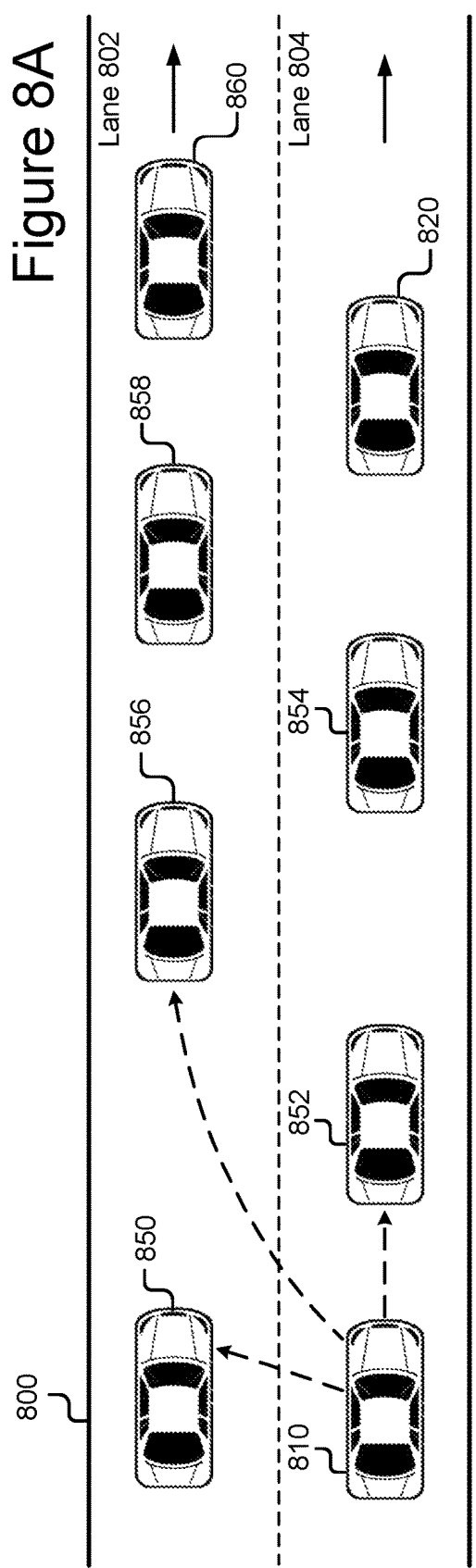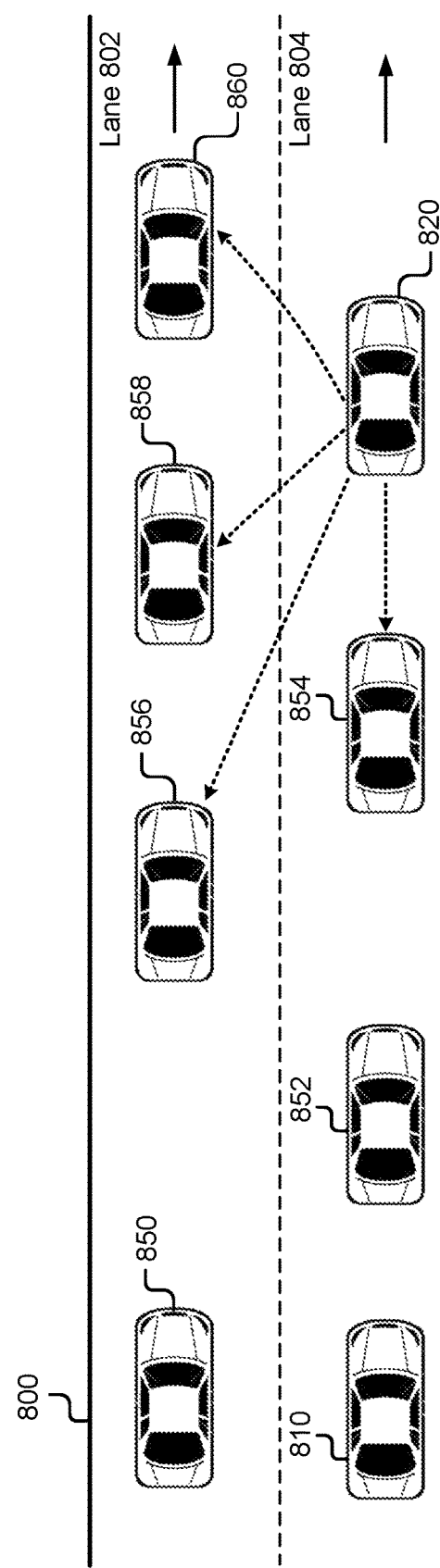

COOPERATIVE VEHICLE MONITORING

BACKGROUND

The present disclosure relates to vehicle monitoring, and in a more particular example, relates to monitoring unconnected vehicles on roadways using cooperative connected vehicles.

Connected vehicles and unconnected vehicles often travel on the same road. Driving behaviors of the unconnected vehicles usually have significant impacts on traffic safety and driving experience of the connected vehicles. To assist the connected vehicles in driving, some modern systems rely on data collected by the connected vehicles to detect objects and vehicles on the road. However, these existing solutions often require a relatively large number of connected vehicles traveling on the road to operate. Furthermore, each connected vehicle can only collect data in a limited area of the surrounding environment and the collected data is usually not shared between the connected vehicles. As a result, the object detection based on this collected data is generally incomplete and these existing solutions also lack a comprehensive understanding of the driving context to accurately estimate the driving behaviors of the vehicles. Other systems rely on collected data related to vehicle operations to estimate the driving behaviors of the vehicles. However, these existing systems are generally incapable of estimating the driving behaviors of the unconnected vehicles due to the lack of their operation data. It is also impractical or impossible for these existing solutions to consider the impact of surrounding traffic on the driving behaviors of the vehicles.

SUMMARY

The subject matter described in this disclosure overcomes the deficiencies and limitations of the existing solutions by providing novel technology for monitoring vehicles on the roadway using collaboration between connected vehicles.

According to one innovative aspect of the subject matter described in this disclosure, a computer-implemented method comprises: capturing, at a first connected vehicle situated in a travel path segment, first sensor data describing an environment proximate to the first connected vehicle, the environment including a first unconnected vehicle; wirelessly receiving, via a communication network at the first connected vehicle from a second connected vehicle situated in the travel path segment, second sensor data describing one or more operating characteristics of the first unconnected vehicle; and estimating, using the first sensor data and the second sensor data, a vehicle action of the first unconnected vehicle.

In general, another innovative aspect of the subject matter described in this disclosure may be embodied in a first connected vehicle comprising: one or more processors; and one or more sensors and a wireless transceiver coupled to the one or more processors via a communication bus, the one or more processors being configured to perform operations including: capturing, using the one or more sensors, first sensor data describing an environment proximate to the first connected vehicle situated in a travel path segment, the environment including a first unconnected vehicle; wirelessly receiving, via the wireless transceiver from a second connected vehicle situated in the travel path segment, second sensor data describing one or more operating characteristics of the first unconnected vehicle; and estimating, using the first sensor data and the second sensor data, a vehicle action of the first unconnected vehicle.

In general, another innovative aspect of the subject matter described in this disclosure may be embodied in a system comprising: one or more processors; a memory storing instructions that, when executed, cause the system to perform operations including: receiving, from a first connected vehicle situated in a travel path segment, first sensor data describing an environment proximate to the first connected vehicle, the environment including a first unconnected vehicle; receiving, from a second connected vehicle situated in the travel path segment, second sensor data describing one or more operating characteristics of the first unconnected vehicle; estimating, using the first sensor data and the second sensor data, a vehicle action of the first unconnected vehicle; and transmitting, to the first connected vehicle, the vehicle action of the first unconnected vehicle.

These and other implementations may each optionally include one or more of the following features: that the first connected vehicle is located proximate to the first unconnected vehicle in the travel path segment, and the first unconnected vehicle is obscured from being captured by one or more sensors of the first connected vehicle and at least partially unobscured from being captured by one or more sensors of the second connected vehicle; that the vehicle action of the first unconnected vehicle includes one or more of an excessive braking action, a non-indicated lane change action, a traffic impeding action, a speeding action, and a tailgating action; that generating, for a connected vehicle associated with the travel path segment, a vehicle instruction based on the vehicle action of the first unconnected vehicle, and transmitting the vehicle instruction to the connected vehicle; that assigning a temporary identifier for the first unconnected vehicle, and transmitting the temporary identifier of the first unconnected vehicle and an alert notification describing the vehicle action of the first unconnected vehicle to one or more connected vehicles associated with the travel path segment; that the temporary identifier of the first unconnected vehicle indicates one or more of a vehicle attribute of the first unconnected vehicle and a vehicle attribute of a proximate vehicle located proximate to the first unconnected vehicle, and a vehicle location of the first unconnected vehicle relative to the proximate vehicle; that monitoring the first unconnected vehicle, updating the temporary identifier of the first unconnected vehicle based on a vehicle attribute of a different proximate vehicle and a vehicle location of the first unconnected vehicle relative to the different proximate vehicle, and transmitting the updated temporary identifier of the first unconnected vehicle to the one or more connected vehicles associated with the travel path segment; that accumulating the one or more operating characteristics of the first unconnected vehicle at a plurality of timestamps, and wherein estimating the vehicle action of the first unconnected vehicle is based on the accumulated one or more operating characteristics of the first unconnected vehicle; that a relative location of the second connected vehicle relative to the first connected vehicle and the first unconnected vehicle includes one of the second connected vehicle is situated behind the first connected vehicle in a neighboring lane of the first connected vehicle, the second connected vehicle is situated between the first connected vehicle and the first unconnected vehicle in one of a neighboring lane and a same lane of the first connected vehicle, and the second connected vehicle is situated in front of the first unconnected vehicle in one of the neighboring lane and the same lane of the first connected vehicle; that determining, using the first sensor data captured by the first connected vehicle, one or more operating characteristics of a second unconnected vehicle situated in the travel path segment, the second unconnected vehicle located proximate to the first connected vehicle; that determining, using the first sensor data and the wirelessly received second sensor data, that the first unconnected vehicle is a preceding vehicle of the second unconnected vehicle, and determining a vehicle following pattern of the second unconnected vehicle based on the one or more operating characteristics of the second unconnected vehicle and the one or more operating characteristics of the first unconnected vehicle; that determining the vehicle following pattern of the second unconnected vehicle includes determining, using the one or more operating characteristics of the second unconnected vehicle and the one or more operating characteristics of the first unconnected vehicle, a second vehicle action of the second unconnected vehicle that was caused by a first vehicle action of the first unconnected vehicle, updating a set of vehicle actions associated with the second unconnected vehicle to exclude the second vehicle action from the set of vehicle actions, and determining the vehicle following pattern of the second unconnected vehicle using the updated set of vehicle actions associated with the second unconnected vehicle; that determining, using the first sensor data and the wirelessly received second sensor data, that the first unconnected vehicle is a neighboring vehicle of the second unconnected vehicle, and determining a lane change pattern of the second unconnected vehicle based on the one or more operating characteristics of the second unconnected vehicle and the one or more operating characteristics of the first unconnected vehicle; that determining the lane change pattern of the second unconnected vehicle includes determining, using the one or more operating characteristics of the second unconnected vehicle and the one or more operating characteristics of the first unconnected vehicle, a second vehicle action of the second unconnected vehicle that was caused by a first driving action of the first unconnected vehicle, updating a set of vehicle actions associated with the second unconnected vehicle to exclude the second vehicle action from the set of vehicle actions, and determining the lane change pattern of the second unconnected vehicle using the updated set of vehicle actions associated with the second unconnected vehicle.

Other implementations of one or more of these and other aspects include corresponding systems, apparatus, and computer programs, configured to perform the actions of methods, encoded on non-transitory computer storage devices.

The novel technology for monitoring vehicles using collaboration between connected vehicles in this disclosure is particularly advantageous in a number of respects. For example, the technology described herein can determine and share sensor data describing unconnected vehicles between various connected vehicles on a travel path segment. As a result, the present technology is capable of not only determining vehicle actions of connected vehicles, but also estimating vehicle actions of unconnected vehicles on the travel path segment. In addition, to evaluate a driving pattern of a vehicle (e.g., a target vehicle), the technology described herein is capable of considering impacts of vehicle actions performed by proximate vehicles located adjacent to the target vehicle on the vehicle actions performed by the target vehicle. For example, the present technology can exclude an excessive braking action of the target vehicle that is caused by an excessive braking action previously performed by a preceding vehicle on the travel path segment, thereby accurately evaluating the driving pattern of the target vehicle. In addition, the present technology can obtain a comprehensive understanding of a driving context associated with the target vehicle even if the target vehicle is surrounded by one or more unconnected vehicles that are non-responsive, thereby improving the accuracy in evaluating the driving pattern of the target vehicle.

Furthermore, the technology described herein can transmit a vehicle action and/or a driving pattern of a vehicle (e.g., unconnected vehicle or connected vehicle) to the connected vehicles associated with the travel path segment so that the connected vehicles can adapt their vehicle actions accordingly. For example, the connected vehicles may make a lane change to avoid traveling with a vehicle that performed dangerous vehicle actions or has a driving pattern reflecting high risk of causing traffic accidents. As a result, the traffic safety and driving experience of the connected vehicles can be improved in real-time.

It should be understood that the foregoing advantages are provided by way of example and that the technology may have numerous other advantages and benefits. The disclosure is illustrated by way of example, and not by way of limitation in the figures of the accompanying drawings in which like reference numerals are used to refer to similar elements.

BRIEF DESCRIPTION OF THE DRAWINGS

FIGS. 6A-6C illustrate an example travel path segment including connected vehicles and unconnected vehicles.

FIGS. 7A-7C illustrate another example travel path segment including connected vehicles and unconnected vehicles.

FIGS. 8A-8C illustrate another example travel path segment including connected vehicles and unconnected vehicles.

DESCRIPTION

Figure 1:
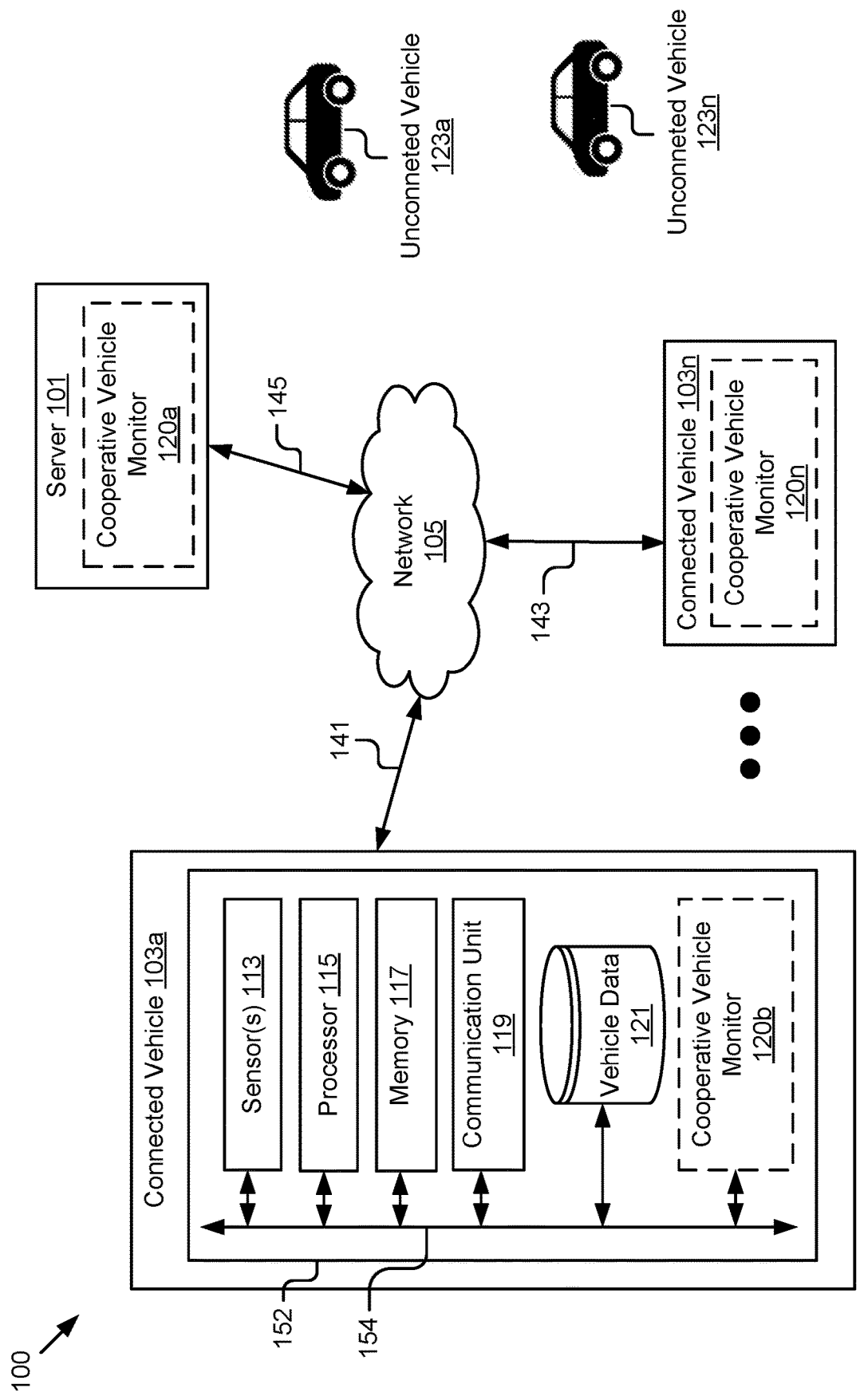
FIG. 1 is a block diagram of an example system for monitoring vehicles using cooperative connected vehicles.

The technology described herein can estimate vehicle actions of unconnected vehicles on the road using collaboration between connected vehicles. The present technology can also consider impacts of proximate vehicles on vehicle actions of a particular vehicle even if the proximate vehicles include one or more unconnected vehicles. As a result, the driving pattern of the particular vehicle on the road can be accurately determined and evaluated, thereby enabling the connected vehicles to adapt their vehicle actions accordingly to improve traffic safety and driving experience. As described in further detail below, the technology includes various aspects, such as cooperative vehicle monitoring methods, systems, computing devices, computer program products, and apparatuses, among other aspects.

As connected vehicles and/or automated vehicles share the roads with unconnected vehicles, it is necessary to accurately monitor driving behaviors of the unconnected vehicles to improve driving safety and vehicle mobility. The technology described herein provides a cooperative monitoring and reporting system to understand the driving behaviors of unconnected vehicles and share the driving behaviors of unconnected vehicles with relevant connected vehicles. The present technology may use vehicle sensors (e.g., camera, radar, LIDAR, etc.) to detect and track various unconnected vehicles on the road, and accurately estimate and predict their vehicle behaviors using traffic flow models and sensor data captured by various connected vehicles in real-time. Due to the cooperative estimation by multiple connected vehicles, the accuracy in determining and tracking vehicle behaviors of the unconnected vehicles can be improved. Moreover, the present technology may also temporarily label the unconnected vehicles and utilize vehicular wireless communication to share the driving behaviors of the unconnected vehicles (e.g., driving score quantifying the driving behaviors of the unconnected vehicles) among the connected vehicles. As a result, the connected vehicles may understand the driving behaviors and future states of the unconnected vehicles, and respond to the current and future vehicle actions of the unconnected vehicles accordingly. With this implementation, the present technology is capable of reducing the risk of traffic accident, improving traffic mobility, and potentially mitigating road congestion and traffic oscillation.

An example cooperative vehicle monitoring system can estimate vehicle action and evaluate driving pattern of an unconnected vehicle traveling along a travel path segment. The travel path segment may include one or more connected vehicles and/or one or more unconnected vehicles traveling thereon. In some embodiments, a connected vehicle may be a vehicle that is capable of communicating with other computing entities (e.g., other connected vehicles, server, etc.). Therefore, the connected vehicle may be responsive and capable of sharing its operating characteristics to other computing entities. On the other hand, an unconnected vehicle may be a vehicle that lacks the capability of communicating with other computing entities, or has such capability but is restricted from or incapable of using it due to various reasons (e.g., system errors, power loss, opt-out settings, etc.). As a result, the unconnected vehicle may be non-responsive and unable to share its operating characteristics to other computing entities.

In some embodiments, to cooperatively monitor a first unconnected vehicle, a first connected vehicle situated in the travel path segment may capture first sensor data using its vehicle sensors. The first sensor data may describe an environment proximate to the first connected vehicle, and the environment may include the first unconnected vehicle. In some embodiments, the first unconnected vehicle may be situated proximate to the first connected vehicle in the travel path segment. However, the first unconnected vehicle may be obscured from being captured by the vehicle sensors of the first connected vehicle due to other vehicles and/or roadway objects, and thus the first connected vehicle may not be able to detect and/or may not be aware of the first unconnected vehicle in the travel path segment. In some embodiments, the first connected vehicle may wirelessly receive second sensor data from a second connected vehicle situated in the travel path segment. The second connected vehicle may be able to capture the first unconnected vehicle using its vehicle sensors, and the second sensor data may describe operating characteristics of the first unconnected vehicle.

In some embodiments, the first connected vehicle may then use the first sensor data captured by its own vehicle sensors and the second sensor data wirelessly received from the second connected vehicle to estimate a vehicle action of the first unconnected vehicle. The first connected vehicle may determine the relative location of the first unconnected vehicle in the travel path segment, and determine the vehicle action performed by the first unconnected vehicle. For example, the first connected vehicle may determine that the first unconnected vehicle is located in front of the first connected vehicle in the same lane with two vehicles situated in between, and determine that the first unconnected vehicle made an abrupt lane change to the neighboring lane. Thus, the first connected vehicle may estimate the vehicle action performed by the first unconnected vehicle although the first unconnected vehicle is non-responsive and/or may not be captured by the vehicle sensors of the first connected vehicle. In some embodiments, the first connected vehicle may use the estimated vehicle action of the first unconnected vehicle to evaluate the driving pattern of the first unconnected vehicle and/or the driving pattern of other vehicles located proximate to the first unconnected vehicle in the travel path segment. In some embodiments, vehicle actions, driving pattern, and/or driving score of the first unconnected vehicle may be determined and shared with the connected vehicles associated with the travel path segment so that these connected vehicles can adjust their vehicle actions accordingly, thereby improving traffic safety and driving experience.

FIG. 1 is a block diagram of an example system 100 for cooperatively monitoring vehicles on the road. As shown, the system 100 includes a server 101, one or more connected vehicles 103a . . . 103n, and one or more unconnected vehicles 123a . . . 123n. The server 101 and the connected vehicles 103a . . . 103n may be coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of connected vehicles 103, unconnected vehicles 123, servers 101, or networks 105.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near-field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. Although FIG. 1 illustrates a single block for the network 105 that couples to the server 101 and the connected vehicle(s) 103, it should be understood that the network 105 may in practice comprise any number of combination of networks, as noted above.

As discussed elsewhere herein, the connected vehicle 103 may be a vehicle platform that is capable of communicating with other computing entities of the system 100 (e.g., the server 101, other connected vehicles 103, etc.). Therefore, the connected vehicle 103 can transmit and receive data (e.g., sensor data, vehicle operating characteristics, etc.) to and from other computing entities of the system 100. The connected vehicle 103 may also be responsive to various communication requests and/or vehicle instructions received via a communication network (e.g., the network 105). On the other hand, the unconnected vehicle 123 may be a vehicle platform that lacks the capability of communicating with other computing entities, or has such capability but is restricted from or incapable of using it due to various reasons (e.g., system errors, power loss, opt-out settings, etc.). Therefore, the unconnected vehicle 123 may be non-responsive and unable to transmit and receive data to and from other computing entities of the system 100. The connected vehicles 103 and the unconnected vehicle 123 may be commonly referred to herein as vehicle(s), and these vehicles are capable of transporting from one point to another. Non-limiting examples of the vehicle include an automobile, a bus, a boat, a plane, a bionic implant, a robot, or any other vehicle platforms.

The connected vehicle 103 may include computing device(s) 152 having sensor(s) 113, processor(s) 115, memory(ies) 117, communication unit(s) 119, vehicle data store(s) 121, and a cooperative vehicle monitor 120. Examples of the computing device 152 may include virtual or physical computer processors, control units, micro-controllers, etc., which are coupled to other components of the connected vehicle 103, such as one or more sensors 113, actuators, motivators, etc. The connected vehicle 103 may be coupled to the network 105 via signal line 141, and may send and receive data to and from other connected vehicle(s) 103 and/or the server 101.

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the connected vehicle 103, the processor may be an electronic control unit (ECU) implemented in the connected vehicle 103 such as a car, although other types of platform are also possible and contemplated. The ECUs may receive and store the sensor data associated with the connected vehicle 103 and/or the sensor data associated with other connected vehicles 103 in the vehicle data store 121 for access and/or retrieval by the cooperative vehicle monitor 120. In some implementations, the processor(s) 115 may be capable of generating and providing electronic display signals to input/output device(s), supporting the display of images, capturing and transmitting images, performing complex tasks including various types of vehicle action estimation and driving pattern computation, etc. In some implementations, the processor(s) 115 may be coupled to the memory(ies) 117 via a communication bus 154 to access data and instructions therefrom and store data therein. The communication bus 154 may couple the processor(s) 115 to the other components of the connected vehicle 103 including, for example, the sensor(s) 113, the memory(ies) 117, the communication unit(s) 119, and/or the vehicle data store 121.

The cooperative vehicle monitor 120 includes software and/or hardware logic executable to monitor unconnected vehicles 123 and/or connected vehicles 103 in the travel path segment using collaboration between one or more connected vehicles 103. As illustrated in FIG. 1, the server 101 and the connected vehicle 103a ... 103n may include instances 120a and 120b ... 120n of the cooperative vehicle monitor 120. In some embodiments, each instance 120a and 120b ... 120n may comprise one or more components the cooperative vehicle monitor 120 depicted in FIG. 2, and may be configured to fully or partially perform the functionalities described herein depending on where the instance resides. In some embodiments, the cooperative vehicle monitor 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The cooperative vehicle monitor 120 may receive and process the sensor data, the vehicle operating characteristics, etc., and communicate with other elements of the connected vehicle 103 via the communication bus 154, such as the memory 117, the communication unit 119, the vehicle data store 121, and various actuators and/or motivators, etc. For example, the cooperative vehicle monitor 120 may communicate a target vehicle speed to one or more speed actuators of the connected vehicle 103 to control the vehicle movement of the connected vehicle 103, thereby increasing the distance between the connected vehicle 103 and an unconnected vehicle 123 that exhibits a dangerous driving pattern. The cooperative vehicle monitor 120 is described in details below with reference to at least FIGS. 2-8C.

The memory(ies) 117 includes a non-transitory computer-usable (e.g., readable, writeable, etc.) medium, which can be any tangible non-transitory apparatus or device that can contain, store, communicate, propagate, or transport instructions, data, computer programs, software, code, routines, etc., for processing by or in connection with the processor(s) 115. For example, the memory(ies) 117 may store the cooperative vehicle monitor 120. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray', etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wireless transceivers and/or wired interfaces for sending and receiving data. The communication unit 119 may couple to the network 105 and communicate with other entities of the system 100, such as other connected vehicle(s) 103 and/or server(s) 101, etc. The communication unit 119 may exchange data with other computing nodes using standard communication methods, such as those discussed above.

The sensor(s) 113 includes any type of sensors suitable for the connected vehicle(s) 103. The sensor(s) 113 may be configured to collect any type of signal data suitable to determine characteristics of the connected vehicle 103 and/or its internal and external environments. Non-limiting examples of the sensor(s) 113 include various optical sensors (CCD, CMOS, 2D, 3D, light detection and ranging (LIDAR), cameras, etc.), audio sensors, photo sensors, motion detection sensors, barometers, altimeters, thermocouples, moisture sensors, infrared (IR) sensors, radar sensors, gyroscopes, accelerometers, speedometers, steering sensors, braking sensors, switches, vehicle indicator sensors, windshield wiper sensors, geo-location sensors (e.g., GPS (Global Positioning System) sensors), orientation sensor, wireless transceivers (e.g., cellular, WiFi™, near-field, etc.), sonar sensors, ultrasonic sensors, proximity sensors, distance sensors, etc. In some embodiments, the sensors 113 may include externally facing sensors provided at the front side, rear side, right side, and/or left side of the connected vehicle 103 to capture the situational context surrounding the connected vehicle 103. In some embodiments, the sensor(s) 113 may include one or more image sensors (e.g., cameras) configured to capture images (e.g., video images, still images) of the environment proximate to the connected vehicle 103 including surrounding vehicles, roadway infrastructure (e.g., lanes, road markings, traffic light, etc.), roadway objects (e.g., traffic cones, barricades, etc.), etc.

The vehicle data store 121 includes a non-transitory storage medium that stores various types of data. For example, the vehicle data store 121 may store vehicle data being communicated between different components of the connected vehicle 103 using a bus, such as a controller area network (CAN) bus. In some embodiments, the vehicle data may include sensor data collected from the sensors 113 that are coupled to different components of the connected vehicle 103 for monitoring operating states of these components (e.g., transmission, vehicle speed, acceleration/deceleration rate, wheel speed (Revolutions Per Minute—RPM), steering angle, braking force, etc.). In some embodiments, the vehicle data may also include the sensor data collected from the sensors 113 that monitor the roadway environment proximate to the connected vehicle 103. In some embodiments, this sensor data may be processed to determine operating characteristics of the proximate vehicles located adjacent to the connected vehicle 103 and being captured by the sensors 113 of the connected vehicle 103 (e.g., vehicle attributes, vehicle dynamics, etc.). In some embodiments, the vehicle data store 121 may also store sensor data that the connected vehicle 103 wirelessly received from other connected vehicles 103. The sensor data received from a first connected vehicle 103 may be captured by the sensors 113 of the first connected vehicles 103 and describe the operating characteristics of the first connected vehicle 103 and/or the roadway environment proximate to the first connected vehicle 103. In some embodiments, this sensor data may be processed to determine operating characteristics of the proximate vehicles located adjacent to the first connected vehicle 103 and being captured by the sensors 113 of the first connected vehicle 103.

In some embodiments, the vehicle data store 121 may store various types of data associated with other vehicles in the travel path segment. For each vehicle (e.g., connected vehicle 103 or unconnected vehicle 123), the vehicle data store 121 may store vehicle attributes describing various aspects that can be used to identify or recognize the vehicle. Non-limiting examples of the vehicle attributes include license plate number, vehicle type (e.g., truck, sedan, etc.), vehicle manufacturer (e.g., Toyota), vehicle model (e.g., Prius), appearance features (e.g., vehicle color and shape, size, textural pattern, etc., of various vehicle parts (hood, bumper, etc.)), etc., of the vehicle. In some embodiments, the vehicle data store 121 may store operating characteristics of the vehicle. The operating characteristics of the vehicle may include vehicle statics describing static aspects of the vehicle (e.g., brake response time, maximum wheel speed, etc.), and vehicle dynamics describing dynamic aspects of the vehicle that reflect vehicle actions performed by the vehicle. Non-limiting examples of the vehicle dynamics include vehicle speed, vehicle orientation, acceleration/deceleration rate, braking distance, lane number of the lane in which the vehicle is traveling, vehicle location (e.g., GPS coordinates, relative position of the vehicle relative to surrounding vehicles, relative distance between the vehicle and surrounding vehicles, etc.), etc., of the vehicle. In some embodiments, the vehicle data store 121 may store multiple set of operating characteristics associated with multiple timestamps for the vehicle, each set of operating characteristics may include the vehicle dynamics describing the vehicle action of the vehicle at the corresponding timestamp. In some embodiments, the vehicle data store 121 may also store a set of vehicle actions performed by the vehicle (e.g., lane change action, braking action, accelerating action, etc.), driving pattern of the vehicle (e.g., vehicle following pattern, lane change pattern, etc.), driving score quantitatively evaluating driving behaviors of the vehicle, etc. Other types of data associated with the vehicle are also possible and contemplated.

In some embodiments, the vehicle data store 121 may be part of a data storage system (e.g., a standard data or database management system) for storing and providing access to data. Other types of data stored in the vehicle data store 121 are also possible and contemplated.

The server 101 includes a hardware and/or virtual server that includes a processor, a memory, and network communication capabilities (e.g., a communication unit). The server 101 may be communicatively coupled to the network 105, as reflected by signal line 145. In some embodiments, the server 101 may send and receive data to and from other entities of the system 100 (e.g., the connected vehicles 103). As depicted, the server 101 may include an instance 120a of the cooperative vehicle monitor 120 as further discussed elsewhere herein. In some embodiments, the server 101 may also include a data store (not shown) that store various types of data associated with various vehicles traveling in various travel path segments (e.g., vehicle attributes, operating characteristics, etc.).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
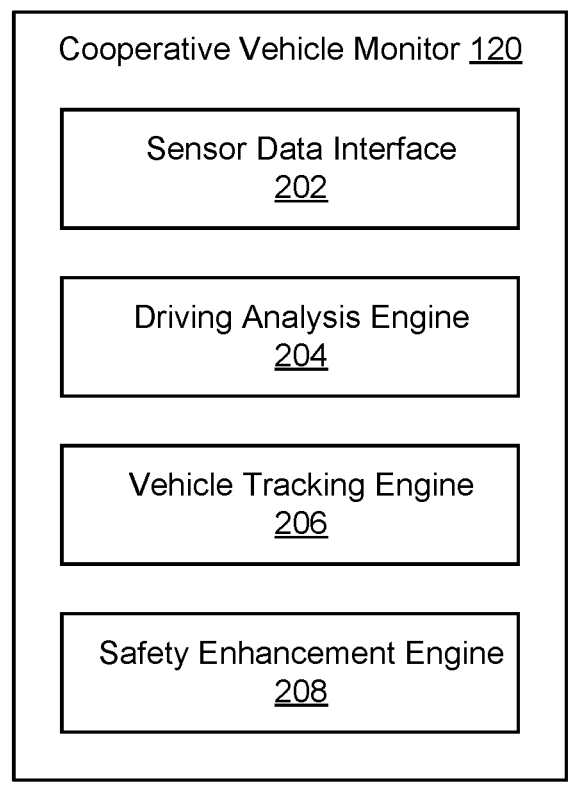
FIG. 2 is a block diagram of an example cooperative vehicle monitor.

FIG. 2 is a block diagram of an example cooperative vehicle monitor 120. As depicted, the cooperative vehicle monitor 120 may include a sensor data interface 202, a driving analysis engine 204, a vehicle tracking engine 206, and a safety enhancement engine 208, although it should be understood that the cooperative vehicle monitor 120 may include additional components such as, but not limited to, a configuration engine, an encryption/decryption engine, etc., and/or these various components may be combined into a single engine or divided into additional engines. In some embodiments, the cooperative vehicle monitor 120 may be implemented in various computing entities of the system 100 and may be configured based on the computing entity in which it is implemented. For example, the cooperative vehicle monitor 120 may be implemented in the connected vehicle 103 and may be configured to receive sensor data from the sensors 113 of the connected vehicle 103 via the communication bus 154 and wirelessly receive sensor data from other connected vehicles 113 via the network 105. In another example, the cooperative vehicle monitor 120 may be implemented in the server 101 and may be configured to wirelessly receive sensor data from various connected vehicles 113 via the network 105.

The sensor data interface 202, the driving analysis engine 204, the vehicle tracking engine 206, and the safety enhancement engine 208 may be implemented as software, hardware, or a combination of the foregoing. In some embodiments, the sensor data interface 202, the driving analysis engine 204, the vehicle tracking engine 206, and the safety enhancement engine 208 may be communicatively coupled by the communication bus 154 and/or the processor 115 to one another and/or the other components of the computing device 152. In some embodiments, one or more of the components 120, 202, 204, 206, and/or 208 are sets of instructions executable by the processor 115 to provide their functionality. In further embodiments, one or more of the 120, 202, 204, 206, and/or 208 are storable in the memory 117 and are accessible and executable by the processor 115 to provide their functionality. In any of the foregoing embodiments, these components 120, 202, 204, 206, and/or 208 may be adapted for cooperation and communication with the processor 115 and other components of the computing device 152. The cooperative vehicle monitor 120, and its components 202, 204, 206, and 208 are described in further detail below with reference to at least FIGS. 3-8C.

Figure 3A:
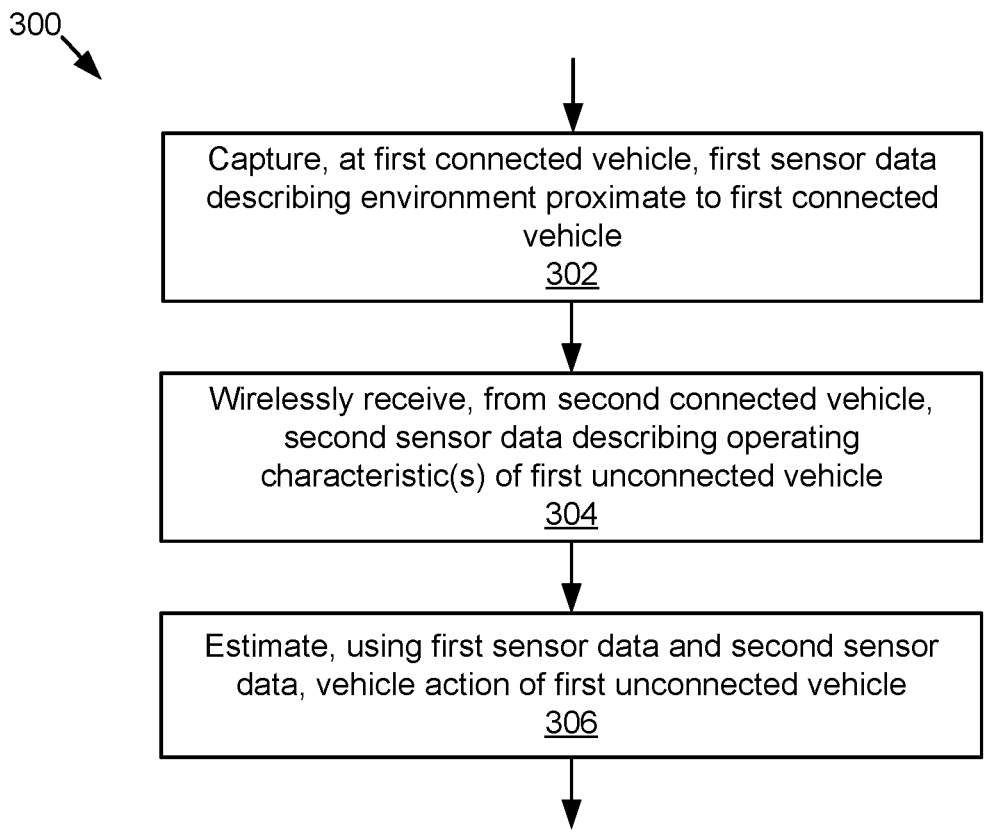
FIG. 3A is a flowchart of an example method for estimating a vehicle action of an unconnected vehicle on a travel path segment.

FIG. 3A is a flowchart of an example method 300 for monitoring an unconnected vehicle 123 in a travel path segment using the collaboration between multiple connected vehicles 103. The method 300 may be performed by the cooperative vehicle monitor 120 implemented on a first connected vehicle 103 situated in the travel path segment. In block 302, the sensors 113 of the first connected vehicle 103 may capture first sensor data describing the environment proximate to the first connected vehicle 103. The environment proximate to the first connected vehicle 103 may cover a roadway area within a predefined distance from the vehicle location of the first connected vehicle 103 (e.g., 50 m) and may include one or more vehicles (e.g., connected vehicles 103 and/or unconnected vehicles 123). In some embodiments, some vehicles in the proximate environment may be obscured from being captured by the sensors 113 of the first connected vehicle 103 by other vehicles and/or roadway objects, while some vehicles in the proximate environment may be at least partially unobscured from being captured by the sensors 113 of the first connected vehicle 103. Thus, the vehicles that are at least partially unobscured from the sensors 113 of the first connected vehicle 103 may be detected by the sensors 113 of the first connected vehicle 103 and may be reflected in the first sensor data captured by these sensors. The vehicles being captured by the sensors 113 of a particular connected vehicle 103 may be referred to herein as the vehicles being captured by the connected vehicle 103, and the sensor data being captured by the sensors 113 of the particular connected vehicle 103 may be referred to herein as the sensor data of the connected vehicle 103.

In some embodiments, the first connected vehicle 103 may determine one or more second connected vehicles 103 located proximate to the first connected vehicle 103. To determine the second connected vehicles 103, the first connected vehicle 103 may broadcast a data request within a predefined distance from its vehicle location (e.g., 200 m). In response to the data request of the first connected vehicle 103, the second connected vehicles 103 may transmit their vehicle attributes and operating characteristics to the first connected vehicle 103. As discussed elsewhere herein, the vehicle attributes of a particular vehicle may describe various aspects that can be used to identify or recognize the vehicle, and the operating characteristics of the vehicle may include the vehicle dynamics reflecting the vehicle movements and the vehicle actions performed by the vehicle. In some embodiments, the second connected vehicles 103 may transmit a set of their operating characteristics to the first connected vehicle 103 at a predefined interval (e.g., 20 s). Each set of operating characteristics may be associated with a timestamp and include the vehicle dynamics of the second connected vehicle at the timestamp.

In some embodiments, the first connected vehicle 103 may determine one or more unconnected vehicles 123 in the proximate environment that are captured by its sensors 113. To determine these unconnected vehicles, the sensor data interface 202 may analyze the first sensor data captured by the sensors 113 of the first connected vehicle 103, and determine the vehicles that are described or reflected in the first sensor data but did not respond to the data request of the first connected vehicle 103 to be the unconnected vehicles 123 being captured by the first connected vehicle 103. In some embodiments, for each unconnected vehicle 123 being captured by the first connected vehicle 103, the sensor data interface 202 may determine the vehicle attributes of the unconnected vehicle 123 based on the first sensor data of the first connected vehicle 103. For example, the sensor data interface 202 may analyze the image data captured by the image sensors 113 of the first connected vehicle 103, and determine one or more of the vehicle type, the vehicle manufacturer, the vehicle model, the license plate number, the appearance features (e.g., vehicle color, shape and size of rear bumper, etc.), etc., of the unconnected vehicle 123.

In some embodiments, for each unconnected vehicle 123 being captured by the first connected vehicle 103, the sensor data interface 202 may also determine the operating characteristics including the vehicle dynamics of the unconnected vehicle 123 based on the first sensor data of the first connected vehicle 103. For example, the sensor data interface 202 may analyze the sensor data captured by various sensors 113 of the first connected vehicle 103 (e.g., image sensors, speed sensors, distance sensors, etc.), and determine one or more of the lane number of the unconnected vehicle 123, the relative position and the relative distance between the unconnected vehicle 123 and its surrounding vehicles (e.g., the unconnected vehicle 123 is located 3 m in front of a black truck and driving parallel to a silver sedan in the neighboring right lane), the vehicle location (e.g., GPS coordinates), the braking indicator status (e.g., braking light is on), the turning indicator status (e.g., signal light is off), etc., of the unconnected vehicle 123. The sensor data interface 202 may also estimate the vehicle speed, the acceleration/deceleration rate, the vehicle orientation, and/or other vehicle dynamics of the unconnected vehicle 123 based on the vehicle dynamics of the first connected vehicle 103 and the relative distance between the unconnected vehicle 123 and the first connected vehicle 103. Other implementations for determining the vehicle attributes and the operating characteristics of the unconnected vehicle 123 are also possible and contemplated.

In some embodiments, similar to the first connected vehicle 103, each connected vehicle 103 situated in the travel path segment may receive the vehicle attributes and the operating characteristics of other connected vehicles 103 from the other connected vehicles 103, and determine the vehicle attributes and the operating characteristics of the unconnected vehicles 123 being captured by the connected vehicle 103 using the sensor data of the connected vehicle 103. Thus, the connected vehicle 103 may obtain the vehicle attributes and the operating characteristics of other connected vehicles 103 located within the predefined distance from its vehicle location (e.g., 200 m), and also obtain of the vehicle attributes and the operating characteristics of the unconnected vehicles 123 being captured by its sensors.

Figure 6C:
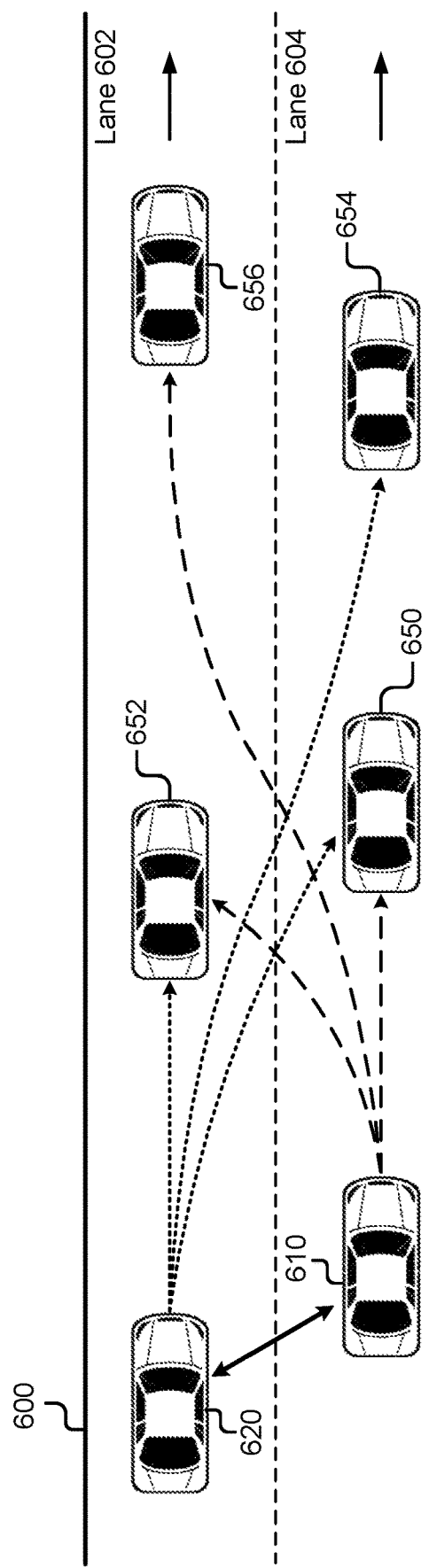

As an example, FIGS. 6A-6C illustrate a travel path segment 600 including lane 602 and lane 604. As depicted in FIG. 6A, the first connected vehicle 610 may capture the vehicles 620, 650, 652, 656 in its proximate environment, and determine that the vehicles 620 and 656 are connected vehicles while the vehicles 650 and 652 are unconnected vehicles. In this example, the sensor data interface 202 of the first connected vehicle 610 may respectively receive the vehicle attributes and the operating characteristics of the connected vehicles 620 and 656 from the connected vehicles 620 and 656, and determine the vehicle attributes and the operating characteristics of the unconnected vehicles 650 and 652 using the first sensor data of the first connected vehicle 610. Similarly, as depicted in FIG. 6B, the second connected vehicle 620 may capture the vehicles 610, 650, 652, 654 in its proximate environment, and determine that the vehicle 610 is a connected vehicle while the vehicles 650, 652, 654 are unconnected vehicles. In this example, the sensor data interface 202 of the second connected vehicle 620 may receive the vehicle attributes and the operating characteristics of the connected vehicle 610 from the connected vehicle 610, and determine the vehicle attributes and the operating characteristics of the unconnected vehicles 650, 652, 654 using the second sensor data of the second connected vehicle 620.

In block 304, the sensor data interface 202 of the first connected vehicle 103 may wirelessly receive second sensor data from a second connected vehicle 103 situated in the travel path segment via the network 105. The second sensor data may describe the vehicle attributes and the operating characteristics of a first unconnected vehicle 123 located proximate to the first connected vehicle 103 in the travel path segment. In some embodiments, the first unconnected vehicle 123 may be situated within a predefined distance from the first connected vehicle 103 (e.g., 30 m). However, the first unconnected vehicle 123 may be obscured from being captured by the sensors 113 of the first connected vehicle 103 and at least partially unobscured from being captured by the sensors 113 of the second connected vehicle 103. Therefore, the first unconnected vehicle 123 may be captured by the second connected vehicle 103 but may not be captured by the first connected vehicle 103. In some embodiments, the second sensor data may also describe the vehicle attributes and the operating characteristics of other vehicles that are captured by the second connected vehicle 103.

In some embodiments, the second connected vehicle 103 may share the second sensor data with the first connected vehicle 103 in the form of the sensor data being captured by the sensors 113 of the second connected vehicle 103 (e.g., captured images), and the sensor data interface 202 may determine the vehicle attributes and the operating characteristics of the first unconnected vehicle 123 from this sensor data. Alternatively, the second connected vehicle 103 may share the second sensor data with the first connected vehicle 103 in the form of the vehicle attributes and the operating characteristics of the first unconnected vehicle 123 that the second connected vehicle 103 determines from this sensor data as discussed above. As a result, the first connected vehicle 103 may be aware of the vehicle attributes and the operating characteristics of the first unconnected vehicle 123 although the first unconnected vehicle 123 is not responsive to the data request of the first connected vehicle 103 and also undetectable by the sensors 113 of the first connected vehicle 103.

Continuing the example in FIGS. 6A-6C, the first connected vehicle 610 and the second connected vehicle 620 may communicate their sensor data with one another as illustrated in FIG. 6C. Due to the vehicle collaboration between the first connected vehicle 610 and the second connected vehicle 620, the first connected vehicle 610 may receive the vehicle attributes and the operating characteristics of the first unconnected vehicle 654 from the second connected vehicle 620, or determine the vehicle attributes and the operating characteristics of the first unconnected vehicle 654 from the second sensor data received from the second connected vehicle 620. Thus, the first connected vehicle 610 may obtain the vehicle attributes and the operating characteristics of the first unconnected vehicle 654 although the first unconnected vehicle 654 is non-responsive and obstructed from the sensors of the first connected vehicle 610 because of the unconnected vehicle 650 situated between the first unconnected vehicle 654 and the first connected vehicle 610.

In block 306, the driving analysis engine 204 of the first connected vehicle 103 may estimate the vehicle action of the first unconnected vehicle 123 using the first sensor data of the first connected vehicle 103 and the second sensor data wirelessly received from the second connected vehicle 103. To estimate the vehicle action of the first unconnected vehicle 123, the driving analysis engine 204 may determine one or more reference vehicles that are described in both the first sensor data of the first connected vehicle 103 and the second sensor data of the second connected vehicle 103 based on the vehicle attributes of the reference vehicles. The driving analysis engine 204 may aggregate the first sensor data of the first connected vehicle 103 and the second sensor data of the second connected vehicle 103 based on the reference vehicles, and determine the relative position of the first unconnected vehicle 123 relative to the first connected vehicle 103 and relative to other vehicles in the travel path segment. As discussed above, the sensor data interface 202 may also receive or compute the operating characteristics including various vehicle dynamics of the first unconnected vehicle 123 using the second sensor data of the second connected vehicle 103. Based on the relative position and the vehicle dynamics of the first unconnected vehicle 123 (e.g., vehicle speed, acceleration/deceleration rate, vehicle orientation, lane number, braking indicator status, etc.), the driving analysis engine 204 may determine the vehicle action performed by the first unconnected vehicle 123 (e.g., accelerating action, braking action, lane change action, tailgating action, etc.).

In some embodiments, the driving analysis engine 204 may use the sensor data received from multiple connected vehicles 103 together with the first sensor data of the first connected vehicle 103 to determine the driving context and the vehicle dynamics of the first unconnected vehicle 123 and estimate the vehicle action of the first unconnected vehicle 123. In some embodiments, the sensor data interface 202 may accumulate the operating characteristics of the first unconnected vehicle 123 over time. The accumulated operating characteristics of the first unconnected vehicle 123 may include the vehicle dynamics of the first unconnected vehicle 123 at multiple timestamps. In some embodiments, the driving analysis engine 204 may estimate the vehicle action of the first unconnected vehicle 123 based on the accumulated operating characteristics of the first unconnected vehicle 123.

Continuing the example in FIGS. 6A-6C, the first connected vehicle 610 may analyze the first sensor data captured by its sensors 113 and the second sensor data received from the second connected vehicle 620, and determine the unconnected vehicle 650 and the unconnected vehicle 652 that are included in both the first sensor data and the second sensor data to be the reference vehicles. The first connected vehicle 610 may map the vehicles reflected in the first sensor data and the vehicles reflected in the second sensor data based on the reference vehicles, and determine that there is a first unconnected vehicle 654 situated in front of the unconnected vehicle 650 in the lane 604. The unconnected vehicle 650 blocks the first unconnected vehicle 654 from the sensors of the first connected vehicle 610, and thus the first connected vehicle 610 may not be aware of the first unconnected vehicle 654 without using the second sensor data received from the second connected vehicle 620. The first connected vehicle 610 may analyze the second sensor data received from the second connected vehicle 620 to determine the vehicle dynamics of the first unconnected vehicle 654 (e.g., vehicle speed, lane number, turning indicator status, etc.).

The first connected vehicle 610 may determine the relative position of the first unconnected vehicle 654 relative to the first connected vehicle 610 and relative to other vehicles in the travel path segment 600 based on the first sensor data of the first connected vehicle 610 and the second sensor data of the second connected vehicle 620. In this example, the first connected vehicle 610 may determine that the first unconnected vehicle 654 is situated in front of the first connected vehicle 610 in the same lane 604 with the unconnected vehicle 650 located in between. The first connected vehicle 610 may also determine the surrounding vehicles of the first unconnected vehicle 654 and the relative distance between the first unconnected vehicle 654 and its surrounding vehicles. In some embodiments, the surrounding vehicle of a first vehicle may be located directly adjacent to the first vehicle without other vehicles in between. The surrounding vehicle of the first vehicle may include a preceding vehicle situated immediately downstream of the first vehicle, and a following vehicle situated immediately upstream of the first vehicle in the same lane of the first vehicle. The surrounding vehicle of the first vehicle may also include one or more neighboring vehicles situated within a predefined distance from the vehicle location of the first vehicle (e.g., 1.5 m) in one of the neighboring lanes immediately next to the lane of the first vehicle. In this example, the first connected vehicle 610 may determine the relative distance between the first unconnected vehicle 654 and its following vehicle 650 in the same lane 604 (e.g., 5 m), and determine the relative distance between the first unconnected vehicle 654 and its neighboring vehicle 656 in the neighboring left lane 602 (e.g., 1.75 m).

The first connected vehicle 610 may determine the vehicle action performed by the first unconnected vehicle 654 based on the relative position and the vehicle dynamics of the first unconnected vehicle 654. For example, the first connected vehicle 610 may determine that the relative distance between the first unconnected vehicle 654 and its following vehicle 650 satisfies a following distance threshold (e.g., less than 1 m), and the vehicle speed of the first unconnected vehicle 654 is below the speed limit of the travel path segment 600. Therefore, the first connected vehicle 610 may determine the vehicle action of the first unconnected vehicle 654 to be the traffic impeding action. As another example, the first connected vehicle 610 may analyze the accumulated operating characteristics of the first unconnected vehicle 654 and determine that the vehicle orientation of the first unconnected vehicle 654 is changed towards the neighboring left lane and the turning indicator status of the first unconnected vehicle 654 is off. Therefore, the first connected vehicle 610 may determine the vehicle action of the first unconnected vehicle 654 to be the non-indicated lane change action. Thus, the first connected vehicle 610 can determine the vehicle actions of the first unconnected vehicle 654 that is not responsive and not captured by the sensors of the first connected vehicle 610.

In addition to determining the vehicle actions of the unconnected vehicles that are not captured by the sensors of the first connected vehicle 610 (e.g., the first unconnected vehicle 654), the first connected vehicle 610 may also determine the vehicle actions of the unconnected vehicles that are captured by the sensors of the first connected vehicle 610 (e.g., the unconnected vehicles 650 and 652) in similar manner based on the first sensor data of the first connected vehicle 610 and/or the sensor data received from other connected vehicles. In this example, because the unconnected vehicles 650 and 652 are captured by both the sensors of the first connected vehicle 610 and the sensors of the second connected vehicle 620, the first connected vehicle 610 may determine the vehicle actions of the unconnected vehicles 650 and 652 using both the first sensor data of the first connected vehicle 610 and the second sensor data of the second connected vehicle 620. The first connected vehicle 610 may also determine the vehicle actions of the connected vehicles 103 that are responsive to the data request of the first connected vehicle 610 (e.g., the connected vehicles 620 and 656) in similar manner based on the sensor data received from these connected vehicles. Thus, the first connected vehicle 610 may be aware of the vehicle actions performed by various vehicles in the travel path segment 600 regardless of whether such vehicle is a connected vehicle 103 or an unconnected vehicle 123 and regardless of whether such vehicle is surrounded by one or more unconnected vehicles 123.

Figure 7C:
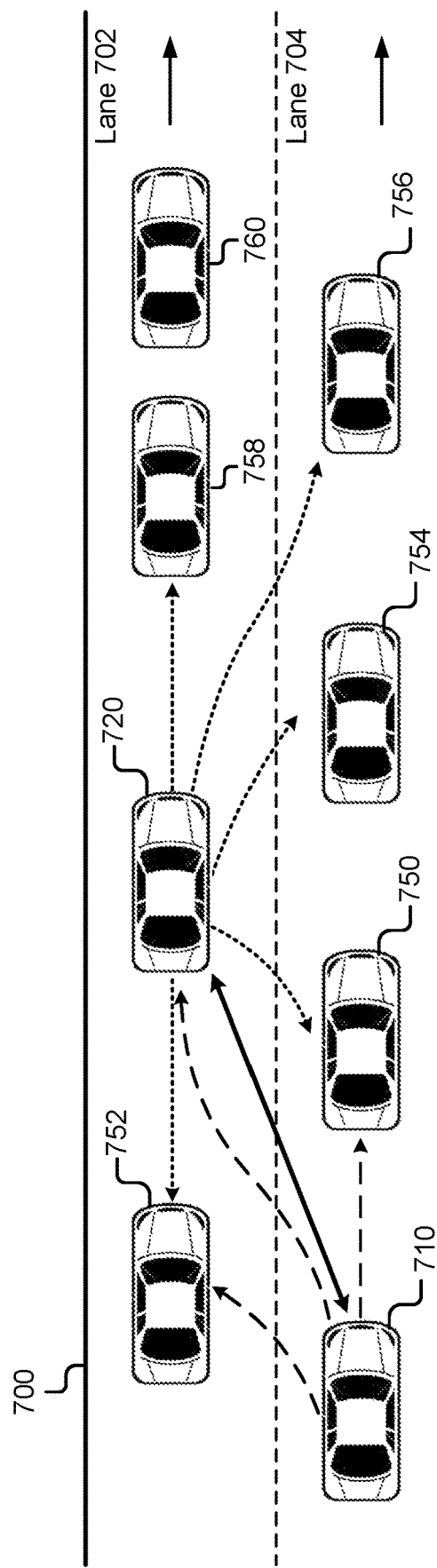

In some embodiments, the second connected vehicle 103 may have various relative location relative to the first connected vehicle 103 and the first unconnected vehicle 123 so that the sensors of the second connected vehicle 103 can capture the first unconnected vehicle 123 that the sensors of the first connected vehicle 103 cannot capture. For example, as depicted in FIGS. 6A-6C, the second connected vehicle 620 may be situated behind the first connected vehicle 610 and the first unconnected vehicle 654 that are in the lane 604, and the second connected vehicle 620 may be in the neighboring lane 602 of the first connected vehicle 610. As another example, FIGS. 7A-7C illustrates a travel path segment 700 that includes the connected vehicles 710, 720, 752, 754 and the unconnected vehicles 750, 756, 758, 760. As depicted, the second connected vehicle 720 may be situated between the first connected vehicle 710 in the lane 704 and the unconnected vehicle 758 in the lane 702, and the second connected vehicle 720 may be in the neighboring lane 702 of the first connected vehicle 710. Alternatively, the second connected vehicle 720 may be situated between the first connected vehicle 710 in the lane 704 and the unconnected vehicle 758 in the lane 702, and the second connected vehicle 720 may be in the same lane 704 of the first connected vehicle 710. In both situations, the second connected vehicle 720 may provide the first connected vehicle 710 with the second sensor data describing the unconnected vehicle 758 that cannot be captured by the sensors of the first connected vehicle 710. In this example, the second sensor data transmitted to the first connected vehicle 710 may also describe the connected vehicle 752 in the lane 702, and the connected vehicle 754 and the unconnected vehicles 750 and 756 and in the lane 704.

Figure 8C:
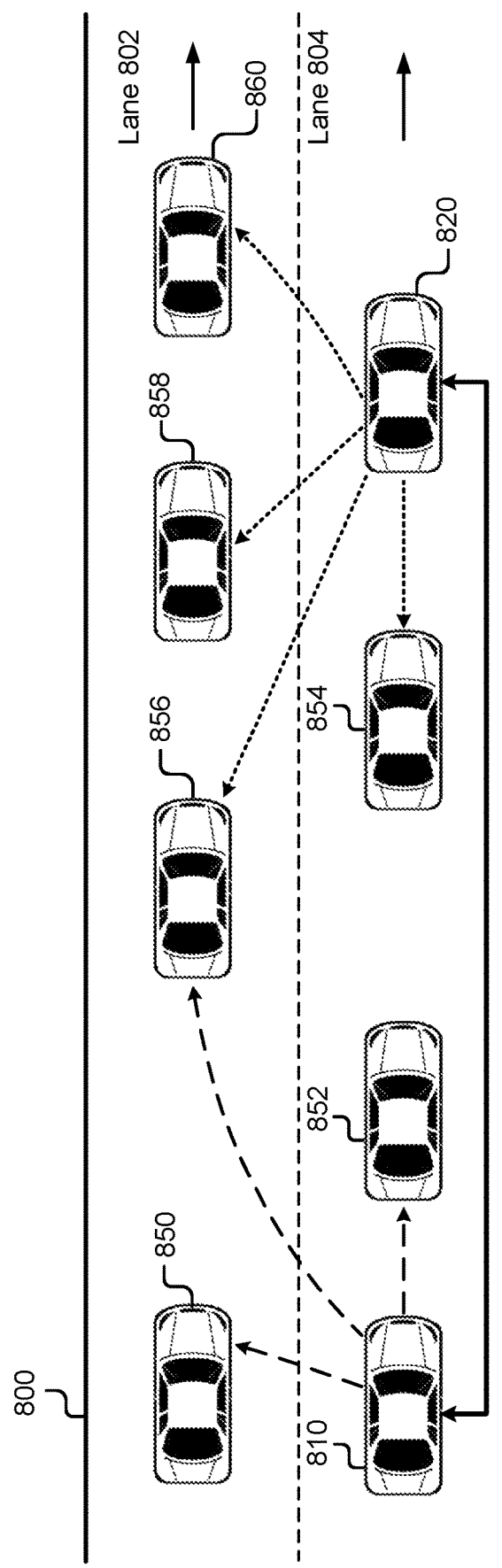

As another example, FIGS. 8A-8C illustrates a travel path segment 800 that includes the connected vehicles 810, 820 and the unconnected vehicles 850-860. As depicted, the second connected vehicle 820 may be situated in front of the first connected vehicle 810 and the unconnected vehicle 854 that are in the lane 804, and the second connected vehicle 820 may be in the same lane 804 of the first connected vehicle 810. Alternatively, the second connected vehicle 820 may be situated in front of the first connected vehicle 810 and the unconnected vehicle 854 that are in the lane 804, and the second connected vehicle 820 may be in the neighboring lane 802 of the first connected vehicle 810. In both situations, the second connected vehicle 820 may provide the first connected vehicle 810 with the second sensor data describing the unconnected vehicle 854 that cannot be captured by the sensors of the first connected vehicle 810. In this example, the second sensor data transmitted to the first connected vehicle 810 may also describe the unconnected vehicles 856, 858, 860. It should be understood that there are other relative positions of the second connected vehicle 103 relative to the first connected vehicle 103 and the first unconnected vehicle 123 in which the sensors of the second connected vehicle 103 can capture the first unconnected vehicle 123 that the sensors of the first connected vehicle 103 cannot capture.

Figure 3B:
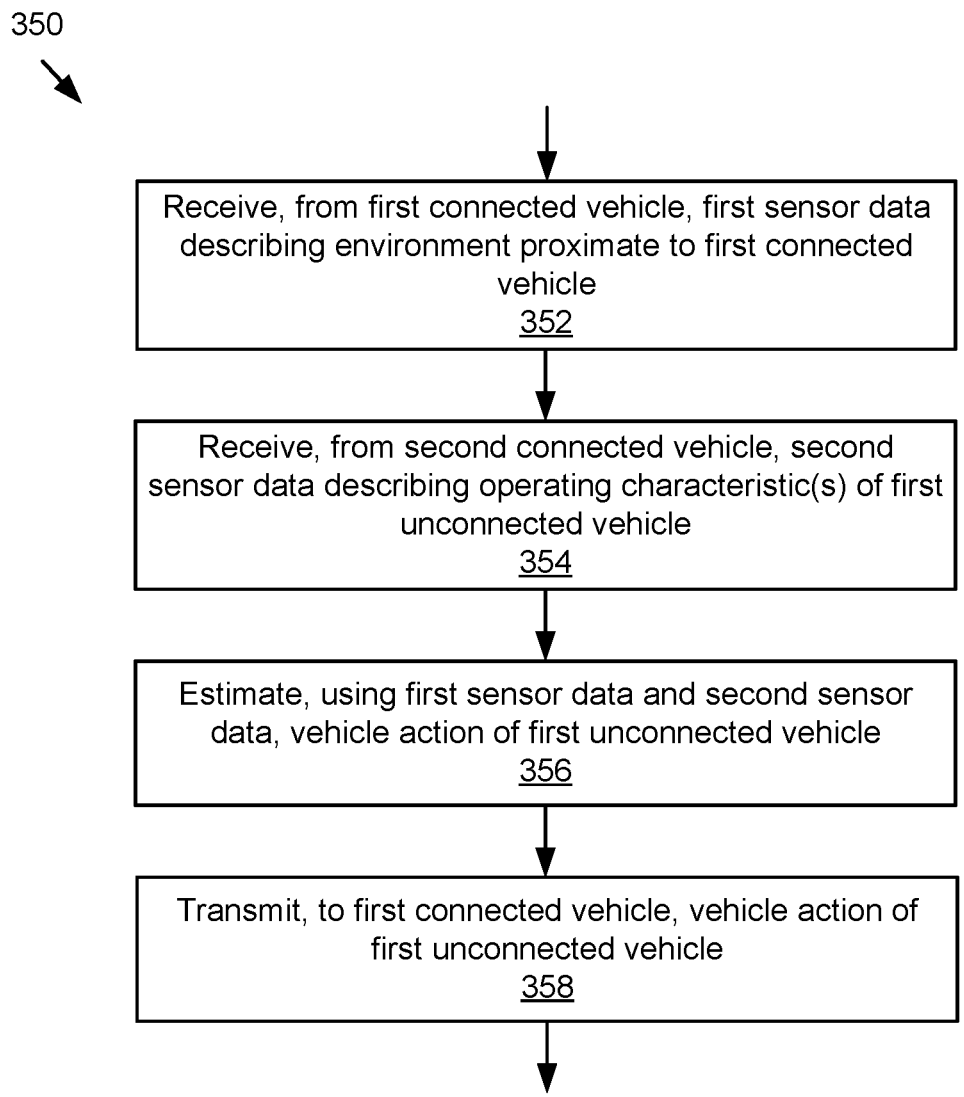
FIG. 3B is a flowchart of another example method for estimating a vehicle action of an unconnected vehicle on a travel path segment

FIG. 3B is a flowchart of an example method 350 for monitoring an unconnected vehicle 123 in a travel path segment using the collaboration between multiple connected vehicles 103. The method 350 may be performed by the cooperative vehicle monitor 120 implemented on the server 101. In block 352, the sensor data interface 202 may receive first sensor data from the first connected vehicle 103 situated in a travel path segment. The first sensor data may be captured by the sensors 113 of the first connected vehicle 103 and may describe the environment proximate to the first connected vehicle 103. As discussed above, the environment proximate to the first connected vehicle 103 may include a first unconnected vehicle 123 that is obscured from being captured by the sensors 113 of the first connected vehicle 103. In block 354, the sensor data interface 202 may receive second sensor data from a second connected vehicle 103 situated in the travel path segment. The second sensor data may be captured by the sensors 113 of the second connected vehicle 103 and may describe the operating characteristics including the vehicle dynamics of the first unconnected vehicle 123. As discussed above, the first unconnected vehicle 123 may be at least partially unobscured from the sensors 113 of the second connected vehicle 103, and thus may be described or reflected in the second sensor data captured by the sensors 113 of the second connected vehicle 103.

In block 356, the driving analysis engine 204 may estimate the vehicle action of the first unconnected vehicle 123 using the first sensor data received from the first connected vehicle 103 and the second sensor data received from the second connected vehicle 103. The vehicle action of the first unconnected vehicle 123 may be estimated from the first sensor data and the second sensor data in a manner similar to block 306 of method 300 in FIG. 3A. For example, the driving analysis engine 204 may analyze the first sensor data and the second sensor data to determine the driving context including the relative position of the first unconnected vehicle 123 and the operating characteristics including the vehicle dynamics of the first unconnected vehicle 123. The driving analysis engine 204 may then determine the vehicle action performed by the first unconnected vehicle 123 based on the relative position and the vehicle dynamics of the first unconnected vehicle 123.

In block 358, the driving analysis engine 204 may transmit the vehicle action performed by the first unconnected vehicle 123 to the first connected vehicle 103. As a result, the first connected vehicle 103 may be aware of the vehicle action performed by the first unconnected vehicle 123 that cannot be captured by the sensors of the first connected vehicle 103. In some embodiments, the driving analysis engine 204 may also determine the vehicle actions performed by the unconnected vehicle 123 that are captured by the sensors of the first connected vehicle 103 using the first sensor data of the first connected vehicle 103 and/or the sensor data received from other connected vehicles 103. The driving analysis engine 204 may also determine the vehicle actions performed by the connected vehicles 103 using their own sensor data and/or the sensor data received from other connected vehicles 103. In some embodiments, the driving analysis engine 204 may transmit the vehicle actions of these vehicles to the first connected vehicle 103.

In some embodiments, once the vehicle action of the first unconnected vehicle 123 is determined, the cooperative vehicle monitor 120 can enhance the traffic safety and the driving experience of the connected vehicles 103 associated with the travel path segment based on the vehicle action of the first unconnected vehicle 123. In some embodiments, the connected vehicles 103 associated with the travel path segment may include the connected vehicles 103 that are located proximate to the travel path segment. Non-limiting examples of the connected vehicles 103 associated with the travel path segment include the connected vehicles 103 approaching the travel path segment (e.g., the connected vehicles 103 predicted to reach the travel path segment within the next 15 minutes), the connected vehicles 103 that have passed the travel path segment (e.g., the connected vehicles 103 that have passed the travel path segment within the last 10 minutes), the connected vehicles 103 travelling within a predefined distance from the travel path segment (e.g., the connected vehicles 103 within the radius of 2 miles from the travel path segment), etc.

In some embodiments, to improve the traffic safety and the driving experience of the connected vehicles 103, the safety enhancement engine 208 may determine whether the vehicle action of the first unconnected vehicle 123 is dangerous or disruptive to the vehicle movements of other vehicles based on the vehicle dynamics corresponding to the vehicle action of the first unconnected vehicle 123 (e.g., vehicle speed, lane number, braking indicator status, turning indicator status, etc.). Non-limiting examples of the dangerous and/or disruptive vehicle action include excessive braking action (e.g., braking hard and late), non-indicated lane change action (e.g., making a lane change without turning on corresponding indicator), speeding action (e.g., traveling at vehicle speed higher than the speed limit), tailgating action (e.g., maintaining a following distance below a following distance threshold (e.g., 0.75 m) relative to the preceding vehicle), traffic impeding action (e.g., traveling at vehicle speed lower than the speed limit and the distance to the following vehicle is below the following distance threshold), etc. Other types of dangerous and/or disruptive vehicle action are also possible and contemplated.

In some embodiments, if the vehicle action of the first unconnected vehicle 123 is dangerous or disruptive to the vehicle movements of other vehicles, the safety enhancement engine 208 may generate a vehicle instruction for a connected vehicle 103 associated with the travel path segment based on the vehicle action of the first unconnected vehicle 123. In some embodiments, the safety enhancement engine 208 may instruct the connected vehicle 103 to make a lane change to avoid traveling in the same lane or in the neighboring lane of the first unconnected vehicle 123. In some embodiments, the safety enhancement engine 208 may compute a target speed for the connected vehicle 103 based on the vehicle speed of the first unconnected vehicle 123 to increase the distance between the connected vehicle 103 and the first unconnected vehicle 123. In some embodiments, if the distance between the connected vehicle 103 and the first unconnected vehicle 123 satisfies a distance threshold (e.g., more than 300 m), the safety enhancement engine 208 may instruct the connected vehicle 103 to re-compute its vehicle route to avoid the road segment in which the first unconnected vehicle 123 is traveling.

In some embodiments, the safety enhancement engine 208 may transmit the vehicle instruction to the connected vehicle 103. In some embodiments, responsive to receiving the vehicle instruction, the connected vehicle 103 may communicate the vehicle instruction to its control unit (e.g., the ECU) to automatically adapt the vehicle action of the connected vehicle 103 accordingly. For example, the control unit may actuate the steering actuators of the connected vehicle 103 to automatically adjust the steering angle of the connected vehicle 103 to make a lane change according to the vehicle instruction. In some embodiments, the connected vehicle 103 may display an instruction message including a recommended action to the driver of the connected vehicle 103 via one or more output devices of the connected vehicle 103. For example, the connected vehicle 103 may display a dynamic map indicating the vehicle location of the first unconnected vehicle 123 and the instruction message on a touch screen of the connected vehicle 103 (e.g., "adjust vehicle speed to 70 mph to stay far ahead of this risky vehicle"). In another example, the instruction message may be provided in the form of a voice instruction for the driver to follow and perform the recommended action.

Figure 4:
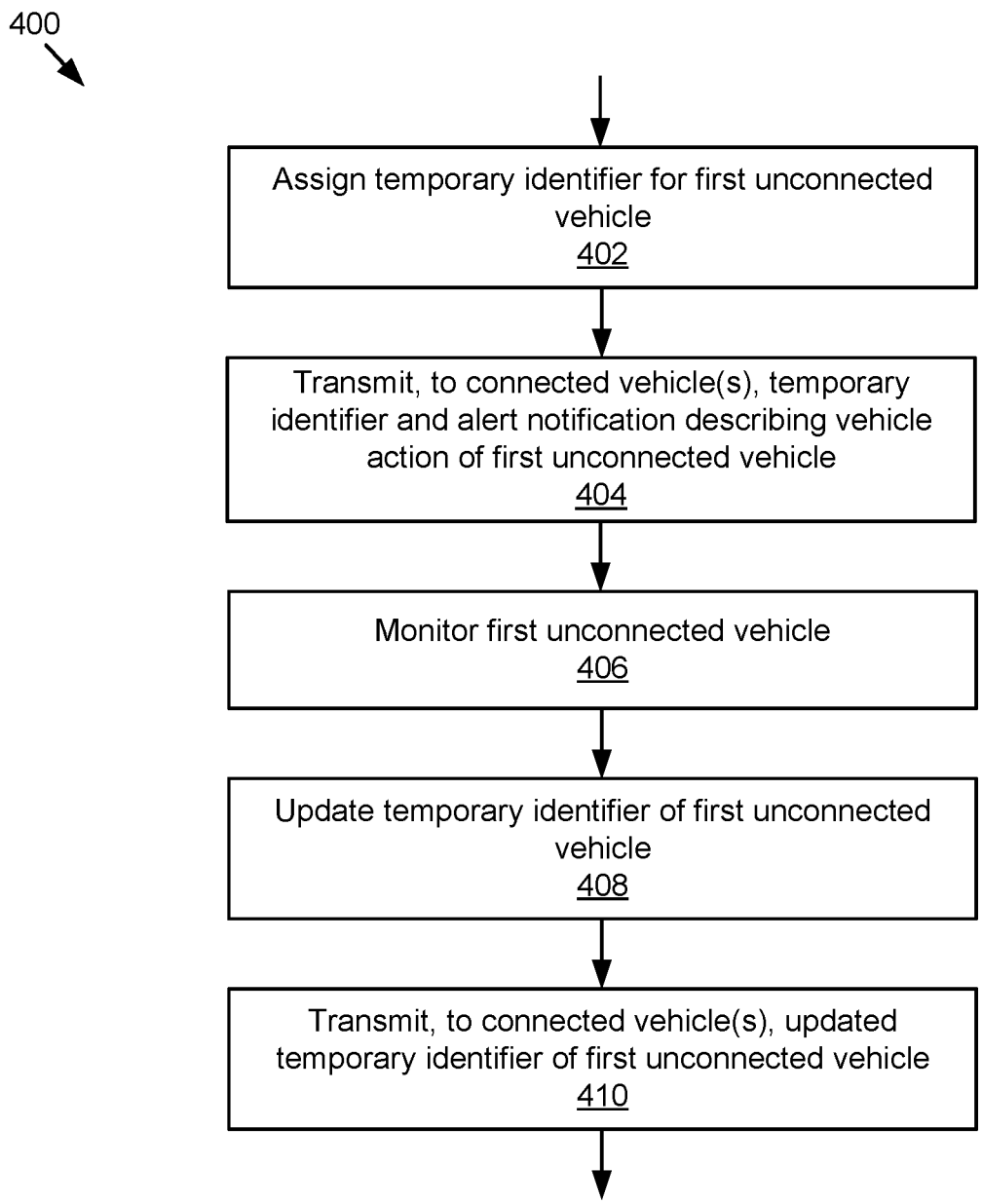
FIG. 4 is a flowchart of an example method for communicating vehicle action of an unconnected vehicle to connected vehicles.

In some embodiments, if the vehicle action of the first unconnected vehicle 123 is dangerous or disruptive to the vehicle movements of other vehicles, the safety enhancement engine 208 may inform the connected vehicles 103 associated with the travel path segment about the vehicle action of the first unconnected vehicle 123, and the connected vehicles 103 may adapt their vehicle actions accordingly. FIG. 4 is a flowchart of an example method 400 for communicating the vehicle action of the first unconnected vehicle 123 to the connected vehicles 103. In block 402, the vehicle tracking engine 206 may assign a temporary identifier for the first unconnected vehicle 123. In some embodiments, the vehicle tracking engine 206 may assign the temporary identifier to the first unconnected vehicle 123 based on the license plate number of the first unconnected vehicle 123. In some embodiments, the vehicle tracking engine 206 may assign the temporary identifier to the first unconnected vehicle 123 based on the vehicle attributes and the vehicle position of the first unconnected vehicle 123. The temporary identifier may indicate the vehicle attributes of the first unconnected vehicle 123, the vehicle attributes of one or more proximate vehicles located proximate to the first unconnected vehicle 123, and the vehicle location of the first unconnected vehicle 123 relative to the one or more proximate vehicles. In some embodiments, the proximate vehicles may be located within a predefined distance from the vehicle location of the first unconnected vehicle 123 in the travel path segment (e.g., 5 m). The proximate vehicles may include the surrounding vehicles that are located directly adjacent to the first unconnected vehicle 123.

Continuing the example in FIGS. 6A-6C, the vehicle tracking engine 206 may assign a temporary identifier for the first unconnected vehicle 654 based on the vehicle attributes (e.g., vehicle type, vehicle manufacturer, vehicle model, appearance features, etc.) and the vehicle location (e.g., lane number, relative location, etc.) of the first unconnected vehicle 654 and its proximate vehicles. In this example, the temporary identifier of the unconnected vehicle 654 may identify the first unconnected vehicle 654 as a white Toyota Prius traveling in lane 604, located in front of a silver Toyota Sienna in the same lane 604 (e.g., the unconnected vehicle 650) at an approximate distance of 3.5 m, and located proximate to a black Toyota Lexus in the neighboring left lane 602 (e.g., the connected vehicle 656) at an approximate distance of 1.5 m.

In block 404, the safety enhancement engine 208 may transmit the temporary identifier of the first unconnected vehicle 123 and an alert notification describing the vehicle action of the first unconnected vehicle 123 to one or more connected vehicles 103 associated with the travel path segment. Thus, the connected vehicles 103 associated with the travel path segment may be informed of the dangerous and/or disruptive vehicle action performed by the first unconnected vehicle 123. Continuing the example in FIGS. 6A-6C, the alert notification may indicate that the first unconnected vehicle 654 performed the traffic impeding action and slowed down the vehicles behind. In some embodiments, responsive to receiving the alert notification, the connected vehicles 103 may store the dangerous and/or disruptive vehicle action of the first unconnected vehicle 123 in association with the temporary identifier of the first unconnected vehicle 123 in the vehicle data store 121.

In block 406, the vehicle tracking engine 206 may monitor the first unconnected vehicle 123. In some embodiments, the vehicle tracking engine 206 may analyze the sensor data communicated from various connected vehicles 103, and determine the vehicle location of the first unconnected vehicle 123 relative to the proximate vehicles of the first unconnected vehicle 123. In some embodiments, the vehicle tracking engine 206 may determine the vehicle attributes of the proximate vehicles of the first unconnected vehicle 123, the lane number of the first unconnected vehicle 123 and its proximate vehicles, the relative position of the first unconnected vehicle 123 relative to its proximate vehicles (e.g., in front of, behind, on the left, on the right, etc.), the relative distance between the first unconnected vehicle 123 and its proximate vehicles (e.g., 2.5 m), etc.

In block 408, the vehicle tracking engine 206 may update the temporary identifier of the first unconnected vehicle 123 based on the vehicle attributes of the proximate vehicles of the first unconnected vehicle 123 and the vehicle location of the first unconnected vehicle 123 relative to its proximate vehicles. As the first unconnected vehicle 123 travels on the road, the first unconnected vehicle 123 may be located proximate to different proximate vehicles. In some embodiments, the vehicle tracking engine 206 may update the temporary identifier of the first unconnected vehicle 123 to indicate the vehicle attributes of the different proximate vehicles and the vehicle location of the first unconnected vehicle 123 relative to the different proximate vehicles. Continuing the example in FIGS. 6A-6C, the vehicle tracking engine 206 may update the temporary identifier of the first unconnected vehicle 654 to indicate that the first unconnected vehicle 654 is now in the lane 602, still preceding the silver Toyota Sienna at an approximate distance of 2 m, following a blue Toyota Tacoma at an approximate distance of 2 m, and located proximate to a red Toyota Land Cruiser in the neighboring right lane 604 at an approximate distance of 1.5 m.

In block 410, the vehicle tracking engine 206 may transmit the updated temporary identifier of the first unconnected vehicle 123 to the connected vehicles 103 associated with the travel path segment. It should be understood that the first unconnected vehicle 123 may be monitored by various connected vehicles 103 and different connected vehicle 103 may update and transmit the updated temporary identifier of the first unconnected vehicle 123 to other connected vehicles 103. Alternatively, the server 101 may monitor the first unconnected vehicle 123 and transmit the updated temporary identifier of the first unconnected vehicle 123 to the connected vehicles 103. In some embodiments, the temporary identifier of the first unconnected vehicle 123 may be associated with a monitoring timestamp at which the temporary identifier of the first unconnected vehicle 123 was assigned or last updated (e.g., 14:30:00), and the vehicle tracking engine 206 may transmit the temporary identifier of the first unconnected vehicle 123 together with the monitoring timestamp to the connected vehicles 103. By monitoring the first unconnected vehicle 123 and updating its temporary identifier, the connected vehicles 103 may keep track of various dangerous and/or disruptive vehicle actions of the first unconnected vehicle 123 that different connected vehicles 103 determine and communicate over time. In addition to the dangerous and/or disruptive vehicle actions of different unconnected vehicles 123, the connected vehicles 103 may also determine and inform one another about the dangerous and/or disruptive vehicle actions of different connected vehicles 103 in similar manner. In some embodiments, the dangerous and/or disruptive vehicle actions of different unconnected vehicles 123 and/or different connected vehicles 103 may be determined by the server 101 and transmitted to the connected vehicles 103.

Figure 5:
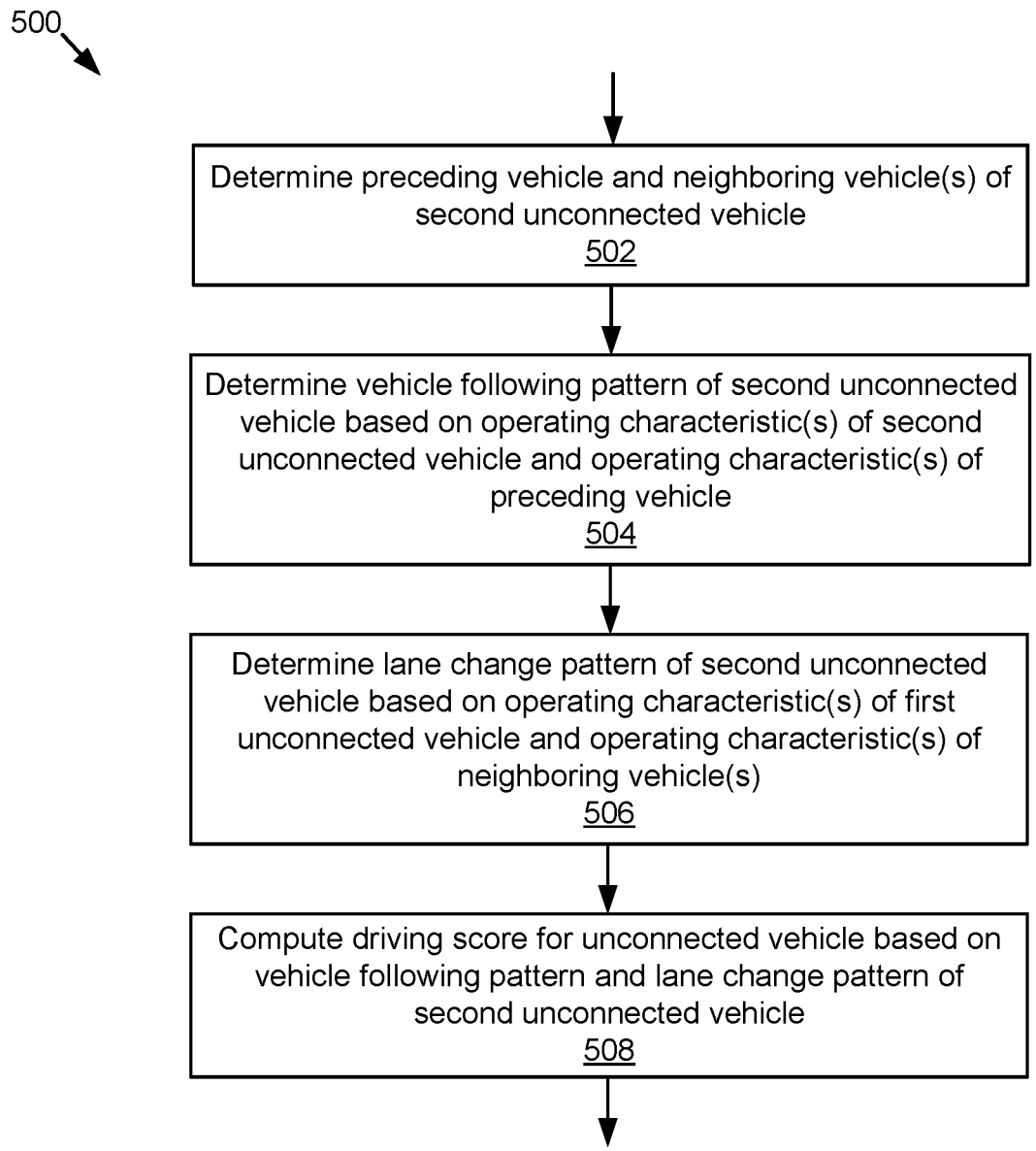
FIG. 5 is a flowchart of an example method for determining and evaluating a driving pattern of an unconnected vehicle.

FIG. 5 is a flowchart of an example method 500 for determining and evaluating a driving pattern of an unconnected vehicle 123. As discussed elsewhere herein, due to the collaboration between the connected vehicles 103, each connected vehicle 103 can obtain the driving context and the operating characteristics of not only the connected vehicles 103 but also the unconnected vehicles 123 in the travel path segment. Each connected vehicle 103 may also be aware of the vehicle actions performed by the connected vehicles 103 and the unconnected vehicles 123. In some embodiments, the driving analysis engine 204 may determine a second unconnected vehicle 123 for which the driving pattern is determined and evaluated. The second unconnected vehicle 123 may be located proximate to the first connected vehicle 103, and thus the vehicle actions of the second unconnected vehicle 123 may likely impact the safety and the driving experience of the first connected vehicle 103. In some embodiments, the second unconnected vehicle 123 may be located within a predefined distance from the vehicle location of the first connected vehicle 103 (e.g., less than 5 m). The second unconnected vehicle 123 may also be referred to herein as the target vehicle.

In some embodiments, the sensor data interface 202 may determine the vehicle attributes and the operating characteristics of the second unconnected vehicle 123, as well as the vehicle attributes and the operating characteristics of other unconnected vehicles 123 and the connected vehicles 103 in the travel path segment as discussed elsewhere herein. The sensor data interface 202 may determine the vehicle attributes and the operating characteristics of the second unconnected vehicle 123 using the first sensor data of the first connected vehicle 103 and/or the sensor data received from other connected vehicles 103 as discussed elsewhere herein.

Continuing the example in FIGS. 6A-6C, the driving analysis engine 204 may determine and evaluate the driving pattern of the second unconnected vehicle 650. In this example, the second unconnected vehicle 650 may be the preceding vehicle located immediately downstream of the first connected vehicle 610 in the same lane 604. Thus, the vehicle actions performed by the second unconnected vehicle 650 may cause the first connected vehicle 610 to adapt its vehicle actions accordingly, and therefore evaluating the driving pattern of the second unconnected vehicle 650 may be useful in improving the safety and the driving experience of the first connected vehicle 610. In this example, the sensor data interface 202 may determine the vehicle attributes and the operating characteristics of the second unconnected vehicle 650 (e.g., the target vehicle) using the first sensor data of the first connected vehicle 610 and/or the second sensor data of the second connected vehicle 620. The sensor data interface 202 may also determine the vehicle attributes and the operating characteristics of other unconnected vehicles (the unconnected vehicles 650, 652) and the connected vehicles (e.g., the connected vehicles 620, 656) in the travel path segment 600 as discussed elsewhere herein.

In some embodiments, to evaluate the driving pattern of the second unconnected vehicle 123, the driving analysis engine 204 may analyze the operating characteristics including various vehicle dynamics of the second unconnected vehicle 123, and compute various driving metrics of the second unconnected vehicle 123. For example, the driving analysis engine 204 may compute the average speed, the average acceleration/deceleration rate, the braking frequency, the lane change frequency, etc., of the second unconnected vehicle 123 based on the vehicle dynamics of the second unconnected vehicle 123 (e.g., the vehicle speed, the acceleration/deceleration rate, the braking indicator status, etc.). However, the vehicle actions of the second unconnected vehicle 123 may also be impacted by the vehicle actions performed by its proximate vehicles. For example, an excessive braking action performed by the preceding vehicle of the second unconnected vehicle 123 may cause the second unconnected vehicle 123 to also perform an excessive braking action, although the second unconnected vehicle 123 may generally avoid performing this dangerous and disruptive vehicle action. Therefore, to accurately estimating and evaluating the driving pattern of the second unconnected vehicle 123, it is necessary to consider the vehicle actions of the proximate vehicles of the second unconnected vehicle 123 in addition to analyzing the vehicle actions of the second unconnected vehicle 123 (e.g., the target vehicle) as reflected in its vehicle dynamics.

In block 502, the driving analysis engine 204 may determine the preceding vehicle and the neighboring vehicles of the second unconnected vehicle 123. In some embodiments, the driving analysis engine 204 may analyze the sensor data received from various connected vehicles 103, and determine the surrounding vehicles including the preceding vehicle, the following vehicle, and the neighboring vehicle(s) of the second unconnected vehicle 123. Continuing the example in FIGS. 6A-6C, the driving analysis engine 204 may analyze the first sensor data of the first connected vehicle 610 and the second sensor data wirelessly received from the second connected vehicle 620 to determine the relative position of the second unconnected vehicle 650 relative to the proximate vehicles in the travel path segment 600. In this example, the driving analysis engine 204 may determine that the preceding vehicle of the second unconnected vehicle 650 is the first unconnected vehicle 654, the following vehicles of the second unconnected vehicle 650 is the first connected vehicle 610, and the neighboring vehicle of the second unconnected vehicle 650 is the unconnected vehicle 652 and the connected vehicle 656 in the neighboring left lane 602.

In block 504, the driving analysis engine 204 may determine a vehicle following pattern of the second unconnected vehicle 123 based on the operating characteristics of the second unconnected vehicle 123 and the operating characteristics of the preceding vehicle of the second unconnected vehicle 123. The vehicle following pattern of the second unconnected vehicle 123 may describe the driving behaviors of the second unconnected vehicle 123 in following its preceding vehicle. In some embodiments, the driving analysis engine 204 may apply a vehicle following model to the vehicle dynamics of the second unconnected vehicle 123 and the vehicle dynamics of the preceding vehicle of the second unconnected vehicle 123, and generate the vehicle following pattern of the second unconnected vehicle 123 in which the vehicle dynamics of the second unconnected vehicle 123 (e.g., vehicle location, vehicle speed, acceleration/deceleration rate, braking distance, etc.) are represented as a function of the vehicle location and the vehicle speed of the second unconnected vehicle 123 and the vehicle location and the vehicle speed of the preceding vehicle of the second unconnected vehicle 123. Non-limiting examples of the vehicle following model include Intelligent Driver Model (IDM), Newell model, Bando model, etc. Other microscopic following models are also possible and contemplated. Using the microscopic following model is advantageous, because it can comprehensively and accurately reflect the vehicle following pattern of the vehicle.

As discussed elsewhere herein, the vehicle action of the preceding vehicle of the second unconnected vehicle 123 may have significant impact on the vehicle action of the second unconnected vehicle 123. The second unconnected vehicle 123 may have to perform a dangerous or disruptive vehicle action to timely react to a dangerous or disruptive vehicle action performed by its preceding vehicle. For example, the preceding vehicle of the second unconnected vehicle 123 performing an excessive braking action may cause the second unconnected vehicle 123 to also perform an excessive braking action to avoid collision. Therefore, to accurately evaluate the driving behaviors of the second unconnected vehicle 123, this dangerous or disruptive vehicle action of the second unconnected vehicle 123 may not be considered in determining the vehicle following pattern of the second unconnected vehicle 123.

In some embodiments, the driving analysis engine 204 may determine a second vehicle action of the second unconnected vehicle 123 that was caused by a first vehicle action of the preceding vehicle of the second unconnected vehicle 123. The driving analysis engine 204 may analyze the accumulated operating characteristics of the second unconnected vehicle 123 and the preceding vehicle of the second unconnected vehicle 123 that include the vehicle dynamics of these vehicles at multiple timestamps, and determine the first vehicle action of the preceding vehicle of the second unconnected vehicle 123 that causes the second vehicle action of the second unconnected vehicle 123 based on the vehicle dynamics corresponding these vehicle actions. In some embodiments, the driving analysis engine 204 may update a set of vehicle actions associated with the second unconnected vehicle 123 to exclude the second vehicle action from the set of vehicle actions associated with the second unconnected vehicle 123. In some embodiments, the driving analysis engine 204 may determine the vehicle following pattern of the second unconnected vehicle 123 using the updated set of vehicle actions associated with the second unconnected vehicle 123.

Continuing the example in FIGS. 6A-6C, the driving analysis engine 204 may analyze the accumulated operating characteristics of the second unconnected vehicle 650 (e.g., the target vehicle) and the first unconnected vehicle 654 (e.g., the preceding vehicle) that include the vehicle dynamics of the second unconnected vehicle 650 and the first unconnected vehicle 654 at multiple timestamps. In this example, the driving analysis engine 204 may determine that the first unconnected vehicle 654 performed an excessive braking action at the timestamp $t=t_1=14:00:00$ (e.g., deceleration rate of 7.7 mph/s>7.5 mph/s) and caused the second unconnected vehicle 650 to perform an excessive braking action at the subsequent timestamp $t=t_2=14:00:01$ (e.g., deceleration rate of 7.9 mph/s>7.5 mph/s). Because the excessive braking action of the second unconnected vehicle 650 is caused by the excessive braking action of its preceding vehicle, the driving analysis engine 204 may disregard the excessive braking action of the second unconnected vehicle 650 in determining the vehicle following pattern of the second unconnected vehicle 650. For example, the driving analysis engine 204 may remove the vehicle dynamics corresponding to the excessive braking action of the second unconnected vehicle 650 (e.g., the target vehicle) and the excessive braking action of the first unconnected vehicle 654 (e.g., the preceding vehicle) from the vehicle dynamics of the second unconnected vehicle 650 and the first unconnected vehicle 654 being used to determine the vehicle following pattern of the second unconnected vehicle 650. Thus, the vehicle following pattern of the second unconnected vehicle 650 may accurately reflect the driving behaviors of the second unconnected vehicle 650 in following its preceding vehicle.

In block 506, the driving analysis engine 204 may determine a lane change pattern of the second unconnected vehicle 123 based on the operating characteristics of the second unconnected vehicle 123 and the operating characteristics of one or more neighboring vehicles of the second unconnected vehicle 123. The lane change pattern of the second unconnected vehicle 123 may describe the driving behaviors of the second unconnected vehicle 123 in making a lane change to its neighboring lane. In some embodiments, the driving analysis engine 204 may apply a lane change model to the vehicle dynamics of the second unconnected vehicle 123 and the vehicle dynamics of the neighboring vehicles of the second unconnected vehicle 123, and generate the lane change pattern of the second unconnected vehicle 123. In some embodiments, the lane change pattern may indicate the probability of the second unconnected vehicle 123 making a lane change to a neighboring lane based on the vehicle speed of the second unconnected vehicle 123, the vehicle speed of the neighboring vehicles in the neighboring lane, the distance between the neighboring vehicles, the relative distance between the second unconnected vehicle 123 and the neighboring vehicles, etc. Non-limiting examples of the lane change model include MOBIL model (Minimizing Overall Braking Induced by Lane Changes), discrete choice model, etc. Other microscopic lane change models are also possible and contemplated. Using the microscopic lane change model is advantageous, because it can comprehensively and accurately reflect the lane change pattern of the vehicle.

In some embodiments, the vehicle action of the neighboring vehicles of the second unconnected vehicle 123 in the neighboring lane may affect the vehicle action of the second unconnected vehicle 123 in making a lane change to the neighboring lane. The second unconnected vehicle 123 may have to perform a dangerous or disruptive vehicle action to safely merge into the neighboring lane. For example, the neighboring vehicles may travel at the speed limit in the neighboring right lane and the distance between them is not sufficient to accommodate the second unconnected vehicle 123. The second unconnected vehicle 123 may speed up over the speed limit (e.g., vehicle speed >70 mph) to pass the neighboring vehicles in its current lane and merge into a larger space in front of the neighboring vehicles in the neighboring right lane, thereby safely merging into the neighboring right lane in time to take the freeway exit. Therefore, to accurately evaluate the driving behaviors of the second unconnected vehicle 123, this dangerous or disruptive vehicle action of the second unconnected vehicle 123 may not be considered in determining the lane change pattern of the second unconnected vehicle 123.

In some embodiments, the driving analysis engine 204 may determine a second vehicle action of the second unconnected vehicle 123 that was caused by one or more first vehicle actions of one or more neighboring vehicles of the second unconnected vehicle 123. The driving analysis engine 204 may analyze the accumulated operating characteristics of the second unconnected vehicle 123 and the neighboring vehicles of the second unconnected vehicle 123 that include the vehicle dynamics of these vehicles at multiple timestamps, and determine the first vehicle actions of the neighboring vehicles of the second unconnected vehicle 123 that cause the second vehicle action of the second unconnected vehicle 123 based on the vehicle dynamics corresponding these vehicle actions. In some embodiments, the driving analysis engine 204 may update a set of vehicle actions associated with the second unconnected vehicle 123 to exclude the second vehicle action from the set of vehicle actions associated with the second unconnected vehicle 123. In some embodiments, the driving analysis engine 204 may determine the lane change pattern of the second unconnected vehicle 123 using the updated set of vehicle actions associated with the second unconnected vehicle 123.

Continuing the example in FIGS. 6A-6C, the driving analysis engine 204 may analyze the accumulated operating characteristics of the second unconnected vehicle 650 (e.g., the target vehicle), the unconnected vehicle 652 and the connected vehicle 656 (e.g., the neighboring vehicles) that include the vehicle dynamics of the second unconnected vehicle 650, the unconnected vehicle 652, and the connected vehicle 656 at multiple timestamps. In this example, the driving analysis engine 204 may determine that the unconnected vehicle 652 and the connected vehicle 656 maintained their vehicle speed at the speed limit (e.g., 70 mph). The driving analysis engine 204 may also determine that the second unconnected vehicle 650 increased its vehicle speed to 75 mph above the speed limit to pass the unconnected vehicle 652 in the lane 604, merged into the distance between the unconnected vehicle 652 and the connected vehicle 656 in the lane 602, and then decreased its vehicle speed to the speed limit.

In this example, because the speeding action of the second unconnected vehicle 650 is temporary and only to safely merge into the distance between the unconnected vehicle 652 and the connected vehicle 656 in the lane 602, the driving analysis engine 204 may disregard the speeding action of the second unconnected vehicle 650 in determining the lane change pattern of the second unconnected vehicle 650. For example, the driving analysis engine 204 may remove the vehicle dynamics corresponding to the speeding action of the second unconnected vehicle 650 (e.g., the target vehicle) and the vehicle actions of the unconnected vehicle 652 and the connected vehicle 656 (e.g., the neighboring vehicles) that are related to the speeding action of the second unconnected vehicle 650 from the vehicle dynamics of the second unconnected vehicle 650, the unconnected vehicle 652, and the connected vehicle 656 being used to determine the lane change pattern of the second unconnected vehicle 650. Thus, the lane change pattern of the second unconnected vehicle 650 may accurately reflect the driving behaviors of the second unconnected vehicle 650 in making a lane change to the neighboring lane.

In block 508, the driving analysis engine 204 may compute a driving score for the second unconnected vehicle 123 based on the vehicle following pattern and the lane change pattern of the second unconnected vehicle 123. The driving score may be a metric that quantitatively evaluates the driving behaviors of the second unconnected vehicle 123. For example, the vehicle following pattern may indicate that the second unconnected vehicle 123 usually follows its preceding vehicle with relative small following distance (e.g., below 1.5 m) and the lane change pattern may indicate that the second unconnected vehicle 123 usually makes a lane change into a relatively small gap between its neighboring vehicles. In this example, the driving score that the driving analysis engine 204 computes for the second unconnected vehicle 123 may be relatively low (e.g., 0.35). In some embodiments, the safety enhancement engine 208 may transmit the driving pattern and/or the driving score of the second unconnected vehicle 123 together with the temporary identifier of the second unconnected vehicle 123 to one or more connected vehicles 103 associated with the travel path segment. Thus, the connected vehicles 103 may identify the second unconnected vehicle 123 using its temporary identifier and be aware of how the second unconnected vehicle 123 drives based on its driving pattern and/or driving score. In some embodiments, the connected vehicles 103 may adaptively adjust their vehicle actions based on the driving pattern and/or the driving score of the second unconnected vehicle 123 to improve traffic safety and driving experience.

In some embodiments, the driving pattern and/or the driving score of the second unconnected vehicle 123 may be transmitted to the connected vehicles 103 in a manner similar to method 400 in FIG. 4. As discussed above with reference to FIG. 4, the temporary identifier of the second unconnected vehicle 123 may be updated over time to indicate the relative position of the second unconnected vehicle 123 as the second unconnected vehicle 123 travels along the travel path segment, and the updated temporary identifier of the second unconnected vehicle 123 may be communicated to the connected vehicles 103. This implementation is advantageous, because it allows the connected vehicles 103 to keep track of the second unconnected vehicle 123, and thus various connected vehicles 103 may rely on the driving pattern and/or the driving score of the second unconnected vehicle 123 that were previously determined to adapt their vehicle actions. This implementation eliminates the need for multiple connected vehicles 103 to re-compute the driving pattern and the driving score of the second unconnected vehicle 123 from the operating characteristics of the second unconnected vehicle 123 and its proximate vehicles.

In some embodiments, the temporary identifier of the second unconnected vehicle 123 may be temporarily active among the connected vehicles 103, and the connected vehicles 103 may use the temporary identifier of the second unconnected vehicle 123 to communicate the driving pattern and/or the driving score of the second unconnected vehicle 123 for a limited time window. As discussed elsewhere herein, the temporary identifier of the second unconnected vehicle 123 may be associated with the monitoring timestamp at which the temporary identifier of the second unconnected vehicle 123 was assigned or last updated. In some embodiments, the driving analysis engine 204 may determine whether the time distance between the current timestamp and the monitoring timestamp associated with the temporary identifier of the second unconnected vehicle 123 satisfies a time distance threshold (e.g., more than 20 s). If the time distance between the current timestamp and the monitoring timestamp associated with the temporary identifier of the second unconnected vehicle 123 satisfies the time distance threshold, the driving analysis engine 204 may determine that the connected vehicles 103 lost track of the second unconnected vehicle 123. For example, the second unconnected vehicle 123 may not be captured by any connected vehicle 103 during a time period longer than the time distance threshold, and thus the temporary identifier of the second unconnected vehicle 123 has not been updated.

In some embodiments, if the connected vehicles 103 lost track of the second unconnected vehicle 123, the driving analysis engine 204 may discard the temporary identifier of the second unconnected vehicle 123 as well as the driving pattern and/or the driving score of the second unconnected vehicle 123 associated with the temporary identifier from the vehicle data store 121. In some embodiments, the second unconnected vehicle 123 may later be captured by another connected vehicle 103 at a subsequent timestamp. This connected vehicle 103 may then compute the driving pattern and the driving score of the second unconnected vehicle 123 from the operating characteristics of the second unconnected vehicle 123 and its proximate vehicles at the subsequent timestamp as discussed above, and transmit the driving pattern and/or the driving score of the second unconnected vehicle 123 together with a new temporary identifier of the second unconnected vehicle 123 to the connected vehicles 103. The connected vehicles 103 may then store the newly computed driving pattern and/or driving score of the second unconnected vehicle 123 in association with the newly assigned temporary identifier of the second unconnected vehicle 123 in the vehicle data store 121.

In some embodiments, responsive to receiving the driving pattern and/or the driving score of the second unconnected vehicle 123, the safety enhancement engine 208 of the connected vehicle 103 may determine whether the driving pattern of the second unconnected vehicle 123 indicates that the second unconnected vehicle 123 usually perform dangerous or disruptive vehicle actions based on the driving pattern of the second unconnected vehicle 123. Alternatively, the safety enhancement engine 208 of the connected vehicle 103 may determine whether the driving score of the second unconnected vehicle 123 satisfies a driving score threshold of the connected vehicle 103 (e.g., less than 0.35). The driving score threshold of the connected vehicle 103 may be the threshold for driving score of other vehicles that the connected vehicle 103 can tolerate. In some embodiments, if the driving pattern of the second unconnected vehicle 123 indicates that the second unconnected vehicle 123 usually perform dangerous or disruptive vehicle actions, or if the driving score of the second unconnected vehicle 123 satisfies the driving score threshold of the connected vehicle 103, the connected vehicle 103 may adapt its vehicle action accordingly to improve the traffic safety and driving experience. For example, as discussed elsewhere herein, the connected vehicle 103 may perform a lane change action to avoid traveling in the same lane or in the neighboring lane of the second unconnected vehicle 123. The connected vehicle 103 may adjust its vehicle speed to increase the distance between the connected vehicle 103 and the second unconnected vehicle 123. If the distance between the connected vehicle 103 and the second unconnected vehicle 123 satisfies a distance threshold (e.g., more than 300 m), the connected vehicle 103 may redirect its vehicle route to avoid the road segment in which the second unconnected vehicle 123 is traveling. Other adaptive vehicle actions of the connected vehicle 103 are also possible and contemplated.

It should be understood that the method 500 is applicable to determine the driving pattern and/or compute the driving score not only for the unconnected vehicles 123 but also for the connected vehicles 103 in the travel path segment. As discussed above, the method 500 can determine the driving pattern and/or the driving score of the target vehicle based on the vehicle dynamics of the target vehicle and also based on the vehicle actions performed by the proximate vehicles of the target vehicle. This implementation is feasibly possible because of the collaboration between various connected vehicles 103 to share their sensor data, thereby enabling the cooperative vehicle monitor 120 to determine the relative position, the vehicle dynamics, and the vehicle actions of the target vehicle and its proximate vehicle regardless of whether the target vehicle and/or its proximate vehicle are connected vehicles 103 or unconnected vehicles 123, and regardless of whether these vehicles are obscured from being captured by the connected vehicle 103 on which the cooperative vehicle monitor 120 is implemented. As discussed elsewhere herein, by excluding the dangerous and/or disruptive vehicle action performed by the target vehicle that are caused by the vehicle actions performed by the proximate vehicles of the target vehicle, the impact of proximate vehicles on the vehicle actions of the target vehicle can be eliminated, and the driving pattern and/or the driving score of the target vehicle can be accurately determined. In addition, the driving pattern and/or the driving score of the target vehicle may be communicated to various connected vehicles 103. As a result, the connected vehicles 103 may adapt their vehicle actions based on the driving pattern and/or the driving score of the target vehicle, thereby improving the traffic safety and the driving experience of the connected vehicles 103.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi') transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
capturing, at a first connected vehicle situated in a travel path segment, first sensor data describing an environment proximate to the first connected vehicle, the environment including a first unconnected vehicle;
wirelessly receiving, via a communication network at the first connected vehicle from a second connected vehicle situated in the travel path segment, second sensor data describing one or more operating characteristics of the first unconnected vehicle;
determining, using one or more of the first sensor data captured by the first connected vehicle and the second sensor data, one or more operating characteristics of a second unconnected vehicle situated in the travel path segment;
estimating, using the first sensor data and the second sensor data, a vehicle action of the first unconnected vehicle; and
determining a vehicle action of the second unconnected vehicle using the vehicle action of the first unconnected vehicle and the one or more operating characteristics of the second unconnected vehicle.

2. The method of claim 1, wherein:
the first connected vehicle is located proximate to the first unconnected vehicle in the travel path segment; and
the first unconnected vehicle is obscured from being captured by one or more sensors of the first connected vehicle and at least partially unobscured from being captured by one or more sensors of the second connected vehicle.

3. The method of claim 1, wherein the vehicle action of the first unconnected vehicle includes one or more of an excessive braking action, a non-indicated lane change action, a traffic impeding action, a speeding action, and a tailgating action.

4. The method of claim 1, further comprising:
generating, for a connected vehicle associated with the travel path segment, a vehicle instruction based on the vehicle action of the first unconnected vehicle; and
transmitting the vehicle instruction to the connected vehicle.

5. The method of claim 1, further comprising:
assigning a temporary identifier for the first unconnected vehicle; and
transmitting the temporary identifier of the first unconnected vehicle and an alert notification describing the vehicle action of the first unconnected vehicle to one or more connected vehicles associated with the travel path segment, wherein the temporary identifier indicates one or more of:
a vehicle attribute of the first unconnected vehicle and a vehicle attribute of a proximate vehicle located proximate to the first unconnected vehicle, and
a vehicle location of the first unconnected vehicle relative to the proximate vehicle;
monitoring the first unconnected vehicle;
updating the temporary identifier of the first unconnected vehicle based on a vehicle attribute of a different proximate vehicle and a vehicle location of the first unconnected vehicle relative to the different proximate vehicle; and
transmitting the updated temporary identifier of the first unconnected vehicle to the one or more connected vehicles associated with the travel path segment.

6. The method of claim 1, further comprising:
accumulating the one or more operating characteristics of the first unconnected vehicle at a plurality of timestamps; and wherein
estimating the vehicle action of the first unconnected vehicle is based on the accumulated one or more operating characteristics of the first unconnected vehicle.

7. The method of claim 1, wherein a relative location of the second connected vehicle relative to the first connected vehicle and the first unconnected vehicle includes one of:
the second connected vehicle is situated behind the first connected vehicle in a neighboring lane of the first connected vehicle;
the second connected vehicle is situated between the first connected vehicle and the first unconnected vehicle in one of a neighboring lane and a same lane of the first connected vehicle; and
the second connected vehicle is situated in front of the first unconnected vehicle in one of the neighboring lane and the same lane of the first connected vehicle.

8. The method of claim 1, further comprising:
determining, using the first sensor data captured by the first connected vehicle, the one or more operating characteristics of the second unconnected vehicle situated in the travel path segment, the second unconnected vehicle located proximate to the first connected vehicle;
determining, using the first sensor data and the wirelessly received second sensor data, that the first unconnected vehicle is a preceding vehicle of the second unconnected vehicle; and
determining a vehicle following pattern of the second unconnected vehicle based on the one or more operating characteristics of the second unconnected vehicle and the one or more operating characteristics of the first unconnected vehicle.

9. The method of claim 8, wherein determining the vehicle following pattern of the second unconnected vehicle includes:
determining, using the one or more operating characteristics of the second unconnected vehicle and the one or more operating characteristics of the first unconnected vehicle, a second vehicle action of the second unconnected vehicle that was caused by a first vehicle action of the first unconnected vehicle;

updating a set of vehicle actions associated with the second unconnected vehicle to exclude the second vehicle action from the set of vehicle actions; and determining the vehicle following pattern of the second unconnected vehicle using the updated set of vehicle actions associated with the second unconnected vehicle.

10. The method of claim 1, further comprising:

determining, using the first sensor data captured by the first connected vehicle, the one or more operating characteristics of the second unconnected vehicle situated in the travel path segment, the second unconnected vehicle located proximate to the first connected vehicle;

determining, using the first sensor data and the wirelessly received second sensor data, that the first unconnected vehicle is a neighboring vehicle of the second unconnected vehicle; and determining a lane change pattern of the second unconnected vehicle based on the one or more operating characteristics of the second unconnected vehicle and the one or more operating characteristics of the first unconnected vehicle, wherein determining the lane change pattern of the second unconnected vehicle includes:

determining, using the one or more operating characteristics of the second unconnected vehicle and the one or more operating characteristics of the first unconnected vehicle, a second vehicle action of the second unconnected vehicle that was caused by a first driving action of the first unconnected vehicle;

updating a set of vehicle actions associated with the second unconnected vehicle to exclude the second vehicle action from the set of vehicle actions; and determining the lane change pattern of the second unconnected vehicle using the updated set of vehicle actions associated with the second unconnected vehicle.

11. A first connected vehicle comprising:

a wireless transceiver;

one or more sensors; and one or more processors coupled to the wireless transceiver and the one or more sensors via a communication bus, the one or more processors being configured to perform operations including:

capturing, using the one or more sensors, first sensor data describing an environment proximate to the first connected vehicle situated in a travel path segment, the environment including a first unconnected vehicle;

wirelessly receiving, via the wireless transceiver from a second connected vehicle situated in the travel path segment, second sensor data describing one or more operating characteristics of the first unconnected vehicle;

determining, using one or more of the first sensor data captured by the first connected vehicle and the second sensor data, one or more operating characteristics of a second unconnected vehicle situated in the travel path segment;

estimating, using the first sensor data and the second sensor data, a vehicle action of the first unconnected vehicle; and determining a vehicle action of the second unconnected vehicle using the vehicle action of the first unconnected vehicle and the one or more operating characteristics of the second unconnected vehicle.

12. The first connected vehicle of claim 11, wherein:

the first connected vehicle is located proximate to the first unconnected vehicle in the travel path segment; and the first unconnected vehicle is obscured from being captured by one or more sensors of the first connected vehicle and at least partially unobscured from being captured by one or more sensors of the second connected vehicle.

13. The first connected vehicle of claim 11, wherein the vehicle action of the first unconnected vehicle includes one or more of an excessive braking action, a non-indicated lane change action, a traffic impeding action, a speeding action, and a tailgating action.

14. The first connected vehicle of claim 11, wherein the operations further include:

generating, for a connected vehicle associated with the travel path segment, a vehicle instruction based on the vehicle action of the first unconnected vehicle; and transmitting the vehicle instruction to the connected vehicle.

15. The first connected vehicle of claim 11, wherein the operations further include:

accumulating the one or more operating characteristics of the first unconnected vehicle at a plurality of timestamps; and wherein estimating the vehicle action of the first unconnected vehicle is based on the accumulated one or more operating characteristics of the first unconnected vehicle.

16. The first connected vehicle of claim 11, wherein a relative location of the second connected vehicle relative to the first connected vehicle and the first unconnected vehicle includes one of:

the second connected vehicle is situated behind the first connected vehicle in a neighboring lane of the first connected vehicle;

the second connected vehicle is situated between the first connected vehicle and the first unconnected vehicle in one of a neighboring lane and a same lane of the first connected vehicle; and the second connected vehicle is situated in front of the first unconnected vehicle in one of the neighboring lane and the same lane of the first connected vehicle.

17. The first connected vehicle of claim 11, wherein the operations further include:

determining, using the first sensor data captured by the first connected vehicle, the one or more operating characteristics of the second unconnected vehicle situated in the travel path segment, the second unconnected vehicle located proximate to the first connected vehicle;

determining, using the first sensor data and the wirelessly received second sensor data, that the first unconnected vehicle is a preceding vehicle of the second unconnected vehicle; and determining a vehicle following pattern of the second unconnected vehicle based on the one or more operating characteristics of the second unconnected vehicle and the one or more operating characteristics of the first unconnected vehicle.

18. The first connected vehicle of claim 17, wherein determining the vehicle following pattern of the second unconnected vehicle includes:

determining, using the one or more operating characteristics of the second unconnected vehicle and the one or more operating characteristics of the first unconnected vehicle, a second vehicle action of the second unconnected vehicle that was caused by a first vehicle action of the first unconnected vehicle;

updating a set of vehicle actions associated with the second unconnected vehicle to exclude the second vehicle action from the set of vehicle actions; and determining the vehicle following pattern of the second unconnected vehicle using the updated set of vehicle actions associated with the second unconnected vehicle.

19. The first connected vehicle of claim 11, wherein the operations further include:

determining, using the first sensor data captured by the first connected vehicle, the one or more operating characteristics of the second unconnected vehicle situated in the travel path segment, the second unconnected vehicle located proximate to the first connected vehicle;

determining, using the first sensor data and the wirelessly received second sensor data, that the first unconnected vehicle is a neighboring vehicle of the second unconnected vehicle; and determining a lane change pattern of the second unconnected vehicle based on the one or more operating characteristics of the second unconnected vehicle and the one or more operating characteristics of the first unconnected vehicle, wherein determining the lane change pattern of the second unconnected vehicle includes:

determining, using the one or more operating characteristics of the second unconnected vehicle and the one or more operating characteristics of the first unconnected vehicle, a second vehicle action of the second unconnected vehicle that was caused by a first driving action of the first unconnected vehicle;

updating a set of vehicle actions associated with the second unconnected vehicle to exclude the second vehicle action from the set of vehicle actions; and determining the lane change pattern of the second unconnected vehicle using the updated set of vehicle actions associated with the second unconnected vehicle.

20. A system comprising:

one or more processors; and a memory storing instructions that, when executed, cause the system to perform operations including:

receiving, from a first connected vehicle situated in a travel path segment, first sensor data describing an environment proximate to the first connected vehicle, the environment including a first unconnected vehicle;

receiving, from a second connected vehicle situated in the travel path segment, second sensor data describing one or more operating characteristics of the first unconnected vehicle;

determining, using one or more of the first sensor data received from the first connected vehicle and the second sensor data, one or more operating characteristics of a second unconnected vehicle situated in the travel path segment;

estimating, using the first sensor data and the second sensor data, a vehicle action of the first unconnected vehicle;

determining a vehicle action of the second unconnected vehicle using the vehicle action of the first unconnected vehicle and the one or more operating characteristics of the second unconnected vehicle; and transmitting, to the first connected vehicle, one or more of the vehicle action of the first unconnected vehicle and the vehicle action of the second unconnected vehicle.

* * * * *